(12) United States Patent
Whitmore et al.

(10) Patent No.: US 12,370,594 B2
(45) Date of Patent: Jul. 29, 2025

(54) TAPERED CUP AND METHOD OF FORMING THE SAME

(71) Applicant: Ball Corporation, Westminster, CO (US)

(72) Inventors: Jonathan A. Whitmore, Denver, CO (US); Sean K. Fitzsimons, Firestone, CO (US); Linda A. Hines, Westminster, CO (US)

(73) Assignee: BALL CORPORATION, Westminster, CO (US)

( * ) Notice: Subject to any disclaimer, the term of this patent is extended or adjusted under 35 U.S.C. 154(b) by 0 days.

(21) Appl. No.: 17/514,496

(22) Filed: Oct. 29, 2021

(65) Prior Publication Data

US 2022/0134405 A1     May 5, 2022

Related U.S. Application Data

(60) Provisional application No. 63/108,102, filed on Oct. 30, 2020.

(51) Int. Cl.
*B21D 22/28*     (2006.01)
*B21D 51/26*     (2006.01)
*B65D 1/26*     (2006.01)
*B65D 21/02*     (2006.01)

(52) U.S. Cl.
CPC ......... *B21D 22/28* (2013.01); *B21D 51/2638* (2013.01); *B65D 1/265* (2013.01); *B65D 21/0233* (2013.01)

(58) Field of Classification Search
None
See application file for complete search history.

(56) References Cited

U.S. PATENT DOCUMENTS

| 348,079 | A | 8/1886 | Wellman |
| 671,427 | A | 4/1901 | Anderson |
| 795,437 | A | 7/1905 | Geuder |
| 1,884,903 | A | 10/1932 | Squires |
| 1,942,930 | A | 1/1934 | Ludington |
| 1,967,245 | A | 7/1934 | Hothersall |
| D110,286 | S | 6/1938 | Krehbiel |
| 2,208,431 | A | 7/1940 | Rochow |
| 2,402,068 | A | 6/1946 | Meador |

(Continued)

FOREIGN PATENT DOCUMENTS

| BR | 7401492 | 8/1996 |
| BR | 30-2018-055351-9 | 10/2019 |
| BR | 20-2017-016121 | 1/2020 |
| CA | 25919 | 10/1963 |
| CA | 872628 | 6/1971 |

(Continued)

OTHER PUBLICATIONS

Official Action (no English translation available) for Mexico Patent Application No. MX/a/2019/009302, dated Jun. 21, 2022, 3 pages.

(Continued)

*Primary Examiner* — Jacob J Cigna
(74) *Attorney, Agent, or Firm* — Sheridan Ross P.C.

(57) ABSTRACT

A metal cup and method of forming the same is provided. Metal cups of the present disclosure comprise a plurality of thin, straight-walled sections and a tapered profile. A domed portion is provided in the bottom of the cup. The cup may comprise a disposable cup, a reusable cup, or a recyclable cup.

8 Claims, 18 Drawing Sheets

(56) References Cited

U.S. PATENT DOCUMENTS

| | | |
|---|---|---|
| D159,599 S | 8/1950 | Chaplin |
| 2,880,902 A | 4/1959 | Owsen |
| 2,905,350 A | 9/1959 | Edwards |
| D189,540 S | 1/1961 | Miller |
| 2,969,030 A | 1/1961 | Kahn et al. |
| 3,009,603 A | 11/1961 | Stockdale |
| 3,079,027 A | 2/1963 | Edwards |
| 3,091,360 A | 5/1963 | Edwards |
| 3,128,029 A | 4/1964 | Price et al. |
| D198,139 S | 5/1964 | Edwards |
| 3,139,213 A | 6/1964 | Edwards |
| D199,336 S | 10/1964 | Wanderer |
| 3,157,335 A | 11/1964 | Maier |
| 3,169,688 A | 2/1965 | Schad |
| 3,186,850 A | 6/1965 | Anthony |
| D202,507 S | 10/1965 | Shelby |
| 3,223,305 A | 12/1965 | Edwards |
| 3,229,595 A | 1/1966 | Waycie |
| 3,262,626 A | 7/1966 | Davis |
| 3,288,340 A | 11/1966 | Shapiro et al. |
| 3,342,370 A | 9/1967 | Johnson |
| 3,349,950 A | 10/1967 | Wanderer |
| 3,363,283 A | 1/1968 | Weber |
| 3,372,830 A | 3/1968 | Edwards |
| D210,767 S | 4/1968 | Anglada |
| 3,375,954 A | 4/1968 | Honkanen et al. |
| D212,279 S | 9/1968 | Bennett et al. |
| D212,352 S | 10/1968 | Davis |
| 3,441,192 A | 4/1969 | Metzler et al. |
| 3,443,714 A | 5/1969 | Edwards |
| 3,485,412 A | 12/1969 | Hawley |
| 3,519,165 A | 7/1970 | Hawley |
| D219,432 S | 12/1970 | Edwards |
| 3,580,468 A | 5/1971 | McDevitt |
| 3,648,888 A | 3/1972 | Cheladze |
| 3,811,393 A | 5/1974 | Close |
| 3,814,040 A | 6/1974 | Habash |
| 3,831,745 A | 8/1974 | Rump et al. |
| 3,850,340 A | 11/1974 | Siemonsen et al. |
| 3,850,361 A | 11/1974 | Day et al. |
| 3,927,766 A | 12/1975 | Day |
| 3,934,725 A | 1/1976 | Edwards |
| 3,949,524 A | 4/1976 | Mickelson |
| 3,995,572 A | 12/1976 | Saunders |
| 4,040,537 A | 8/1977 | Edwards |
| 4,049,122 A * | 9/1977 | Maxwell ................ B65D 1/265 206/520 |
| 4,051,707 A | 10/1977 | Valek et al. |
| 4,052,037 A | 10/1977 | Mair et al. |
| 4,082,184 A | 4/1978 | Hammer |
| D248,916 S | 8/1978 | Reynolds et al. |
| 4,111,303 A | 9/1978 | Compton |
| 4,124,120 A | 11/1978 | Day |
| 4,134,354 A | 1/1979 | Cvacho et al. |
| 4,210,141 A | 7/1980 | Brockman et al. |
| 4,231,476 A | 11/1980 | Compton et al. |
| 4,263,800 A | 4/1981 | Arfert et al. |
| D262,680 S | 1/1982 | Lack et al. |
| D266,398 S | 10/1982 | Haag, Sr. |
| 4,366,696 A | 1/1983 | Durgin et al. |
| 4,368,818 A | 1/1983 | Day et al. |
| 4,373,634 A * | 2/1983 | Edwards ................ B65D 1/265 206/520 |
| 4,386,514 A | 6/1983 | Herten |
| 4,420,081 A | 12/1983 | Dart |
| D272,794 S | 2/1984 | Dart |
| 4,503,702 A | 3/1985 | Bulso, Jr. et al. |
| D280,075 S | 8/1985 | Haag, Sr. |
| D280,076 S | 8/1985 | Haag, Sr. |
| D280,078 S | 8/1985 | Fortuna |
| 4,534,927 A | 8/1985 | Morioka et al. |
| D283,387 S | 4/1986 | Durand |
| D287,919 S | 1/1987 | Clements |
| D293,293 S | 12/1987 | Isles |
| D293,536 S | 1/1988 | Ritman |
| D297,090 S | 8/1988 | West |
| D298,394 S | 11/1988 | Brewer |
| 4,782,685 A | 11/1988 | Bulso, Jr. et al. |
| 4,832,202 A | 5/1989 | Newman et al. |
| 4,846,350 A | 7/1989 | Sorensen |
| 4,909,394 A | 3/1990 | Stewart |
| 4,914,937 A | 4/1990 | Bulso, Jr. et al. |
| 5,014,536 A | 5/1991 | Saunders |
| 5,105,645 A | 4/1992 | Kobayashi et al. |
| 5,160,031 A † | 11/1992 | Palisin |
| D339,744 S | 9/1993 | Seppala |
| D345,073 S | 3/1994 | Carlson |
| D345,081 S | 3/1994 | Adami et al. |
| D350,695 S | 9/1994 | Adami et al. |
| D352,239 S | 11/1994 | Adami et al. |
| D353,297 S | 12/1994 | Sokolski et al. |
| D354,227 S | 1/1995 | Adami et al. |
| D356,733 S | 3/1995 | Adami et al. |
| 5,427,269 A | 6/1995 | Willbrandt |
| D360,133 S | 7/1995 | Boller |
| D364,112 S | 11/1995 | Dickinson et al. |
| 5,487,295 A | 1/1996 | Diekhoff et al. |
| D368,234 S | 3/1996 | Dickinson et al. |
| D373,931 S | 9/1996 | Whitehead |
| 5,555,992 A | 9/1996 | Sedgeley |
| D375,259 S | 11/1996 | Whitehead |
| 5,626,048 A | 5/1997 | McClung |
| D379,738 S | 6/1997 | Liming et al. |
| D381,558 S | 7/1997 | Schaefer et al. |
| D382,200 S | 8/1997 | Brondyke et al. |
| D382,201 S | 8/1997 | Brondyke et al. |
| 5,657,897 A | 8/1997 | Schwartzburg |
| D383,947 S | 9/1997 | Schaefer |
| 5,755,354 A | 5/1998 | Lang |
| D395,411 S | 6/1998 | Grebert |
| 5,769,266 A | 6/1998 | Willbrandt |
| D399,744 S | 10/1998 | Gross |
| D405,387 S | 2/1999 | Masello |
| 5,992,632 A | 11/1999 | Karren |
| D418,371 S | 1/2000 | Whitehead |
| 6,010,028 A | 1/2000 | Jordan et al. |
| 6,038,910 A | 3/2000 | McClung |
| 6,065,603 A | 5/2000 | Filice et al. |
| D436,295 S | 1/2001 | Furman et al. |
| D436,499 S | 1/2001 | Pritchard et al. |
| D440,155 S | 4/2001 | Schaefer |
| D441,252 S | 5/2001 | Gitschlag |
| 6,233,999 B1 | 5/2001 | Yabutani et al. |
| D443,796 S | 6/2001 | Lin |
| D446,687 S | 8/2001 | Furman et al. |
| D449,986 S | 11/2001 | Schaefer |
| 6,382,449 B1 | 5/2002 | Kazmierski et al. |
| D458,807 S | 6/2002 | Trazzi |
| 6,442,991 B1 | 9/2002 | Rojek |
| 6,463,776 B1 | 10/2002 | Enoki et al. |
| 6,497,338 B1 | 12/2002 | Stolzman |
| D469,691 S | 2/2003 | Brondyke et al. |
| D473,134 S | 4/2003 | Nuzzo |
| 6,554,154 B1 | 4/2003 | Chauhan et al. |
| D475,243 S | 6/2003 | Trazzi |
| D476,566 S | 7/2003 | Smith et al. |
| D476,891 S | 7/2003 | Clarke et al. |
| D477,223 S | 7/2003 | Smith et al. |
| D478,006 S | 8/2003 | Smith et al. |
| D483,225 S | 12/2003 | Gain |
| D485,758 S | 1/2004 | Clarke et al. |
| D486,994 S | 2/2004 | Smith et al. |
| D487,214 S | 3/2004 | Rutter et al. |
| D487,669 S | 3/2004 | Smith et al. |
| D489,254 S | 5/2004 | Kocis et al. |
| D489,260 S | 5/2004 | Smith et al. |
| D490,655 S | 6/2004 | Zettle et al. |
| D494,816 S | 8/2004 | Wiedmeyer et al. |
| D494,817 S | 8/2004 | Rutter et al. |
| D496,825 S | 10/2004 | Wiedmeyer et al. |
| D497,774 S | 11/2004 | Smith et al. |
| D498,980 S | 11/2004 | Smith et al. |
| D499,304 S | 12/2004 | Wiedmeyer et al. |
| D499,933 S | 12/2004 | Rutter et al. |

(56) References Cited

U.S. PATENT DOCUMENTS

| | | |
|---|---|---|
| D499,934 S | 12/2004 | Smith et al. |
| D499,935 S | 12/2004 | Smith et al. |
| D499,936 S | 12/2004 | Wiedmeyer et al. |
| 6,866,905 B1 | 3/2005 | Sandstrom et al. |
| D504,593 S | 5/2005 | Smith et al. |
| D505,830 S | 6/2005 | Smith et al. |
| D507,158 S | 7/2005 | Smith et al. |
| D507,461 S | 7/2005 | Smith et al. |
| D508,822 S | 8/2005 | Smith et al. |
| D510,679 S | 10/2005 | Smith et al. |
| D511,647 S | 11/2005 | Smith et al. |
| D511,932 S | 11/2005 | Smith et al. |
| D514,380 S | 2/2006 | Smith et al. |
| D514,385 S | 2/2006 | Smith et al. |
| D514,444 S | 2/2006 | Smith et al. |
| D514,445 S | 2/2006 | Smith et al. |
| D514,884 S | 2/2006 | Smith et al. |
| D514,886 S | 2/2006 | Kingsley |
| D515,866 S | 2/2006 | Wiedmeyer et al. |
| D516,378 S | 3/2006 | Smith et al. |
| D519,751 S | 5/2006 | Etter |
| D526,847 S | 8/2006 | Freeman |
| D528,863 S | 9/2006 | Hayes et al. |
| D530,602 S | 10/2006 | Boller et al. |
| 7,117,066 B2 | 10/2006 | Mannlein et al. |
| 7,121,991 B2 | 10/2006 | Mannlein et al. |
| D531,854 S | 11/2006 | Bresler |
| D533,411 S | 12/2006 | Webb |
| D533,748 S | 12/2006 | Bresler |
| D535,561 S | 1/2007 | Smith et al. |
| D535,822 S | 1/2007 | Smith et al. |
| D536,249 S | 2/2007 | Smith et al. |
| D537,677 S | 3/2007 | Bresler |
| D539,094 S | 3/2007 | Wasserman et al. |
| D539,649 S | 4/2007 | Smith et al. |
| D539,650 S | 4/2007 | Smith et al. |
| D540,167 S | 4/2007 | Smith et al. |
| D544,755 S | 6/2007 | Diesman |
| 7,281,649 B2 | 10/2007 | Pyper, Jr. |
| D554,498 S | 11/2007 | Lovett |
| D554,531 S | 11/2007 | Lovett |
| D563,727 S | 3/2008 | Lovett |
| D568,687 S | 5/2008 | Lovett |
| D570,159 S | 6/2008 | McGill |
| D571,655 S | 6/2008 | Lovett |
| D573,408 S | 7/2008 | Lovett |
| D573,409 S | 7/2008 | Lovett |
| D573,411 S | 7/2008 | Lovett |
| D575,990 S | 9/2008 | Altiner et al. |
| D577,995 S | 10/2008 | Lovett |
| D578,387 S | 10/2008 | Lovett |
| D578,877 S | 10/2008 | Lovett |
| D589,300 S | 3/2009 | Altiner et al. |
| D589,301 S | 3/2009 | Altiner et al. |
| 7,546,932 B2 | 6/2009 | Smith et al. |
| D596,499 S | 7/2009 | Willis et al. |
| D596,903 S | 7/2009 | Willis et al. |
| D607,692 S | 1/2010 | Skala |
| D608,591 S | 1/2010 | Hillebrenner et al. |
| D609,513 S | 2/2010 | Koennecke et al. |
| D609,531 S | 2/2010 | Koennecke |
| D609,532 S | 2/2010 | Koennecke |
| D609,976 S | 2/2010 | Koennecke |
| 7,661,286 B2 | 2/2010 | Warmbrunn |
| D611,384 S | 3/2010 | Biegel |
| D612,201 S | 3/2010 | Hillebrenner |
| D612,202 S | 3/2010 | Hillebrenner |
| D613,554 S | 4/2010 | Koennecke |
| D615,356 S | 5/2010 | Hillebrenner |
| D620,790 S | 8/2010 | Lovett |
| D622,105 S | 8/2010 | Koennecke et al. |
| D624,788 S | 10/2010 | Koennecke |
| D626,863 S | 11/2010 | Lovett |
| D627,596 S | 11/2010 | Hillebrenner et al. |
| D628,436 S | 12/2010 | Koennecke et al. |
| D628,437 S | 12/2010 | Koennecke et al. |
| D631,513 S | 1/2011 | Weinert |
| D635,855 S | 4/2011 | Smith et al. |
| D636,229 S | 4/2011 | Koennecke |
| D636,230 S | 4/2011 | Koennecke |
| 7,934,410 B2 | 5/2011 | Myers et al. |
| D639,606 S | 6/2011 | Koennecke |
| D641,590 S | 7/2011 | Koennecke |
| D649,396 S | 11/2011 | Wilkens et al. |
| D650,634 S | 12/2011 | Hodge et al. |
| D651,046 S | 12/2011 | Myers |
| D651,452 S | 1/2012 | Hillebrenner et al. |
| D655,573 S | 3/2012 | O'Connor |
| D655,574 S | 3/2012 | O'Connor |
| D658,443 S | 5/2012 | Chiu et al. |
| D664,003 S | 7/2012 | Nagoya |
| D664,844 S | 8/2012 | Hale |
| D667,271 S | 9/2012 | Fishman |
| D667,272 S | 9/2012 | Fishman |
| D674,663 S | 1/2013 | Cahen |
| 8,360,263 B2 | 1/2013 | D'Amato |
| D675,482 S | 2/2013 | Heggestad et al. |
| 8,387,816 B2 | 3/2013 | Fallas |
| D679,947 S | 4/2013 | Romley |
| D680,376 S | 4/2013 | Romley |
| D680,377 S | 4/2013 | Romley |
| D680,378 S | 4/2013 | Romley |
| D684,051 S | 6/2013 | Winstanley et al. |
| D684,869 S | 6/2013 | Pellaud et al. |
| D688,522 S | 8/2013 | Pablo |
| D688,553 S | 8/2013 | Winstanley et al. |
| D689,377 S | 9/2013 | Maxwell-Wood |
| 8,556,099 B2 | 10/2013 | Perlman |
| D696,582 S | 12/2013 | Ramsey et al. |
| D696,583 S | 12/2013 | Ramsey et al. |
| D696,593 S | 12/2013 | Farrow et al. |
| 8,616,418 B2 | 12/2013 | Painchaud et al. |
| D696,940 S | 1/2014 | Hale et al. |
| D699,595 S | 2/2014 | Farrow et al. |
| D704,592 S | 5/2014 | Hung et al. |
| 8,727,151 B2 | 5/2014 | Valles et al. |
| D707,568 S | 6/2014 | Stephens et al. |
| 8,746,488 B2 | 6/2014 | Caunter et al. |
| D711,228 S | 8/2014 | Gailly |
| D711,246 S | 8/2014 | Hanson et al. |
| D712,753 S | 9/2014 | Stephens et al. |
| D713,268 S | 9/2014 | Jones et al. |
| D715,162 S | 10/2014 | Farrow et al. |
| D717,605 S | 11/2014 | Kristinik |
| D717,606 S | 11/2014 | Kristinik |
| 8,899,435 B1 | 12/2014 | Reder et al. |
| 8,920,892 B2 | 12/2014 | Hernandez |
| D721,887 S | 2/2015 | Romley |
| D722,823 S | 2/2015 | Del Mar Menendez |
| 8,973,777 B2 | 3/2015 | Ramsey et al. |
| D729,114 S | 5/2015 | Romley |
| D732,343 S | 6/2015 | Romley |
| D732,402 S | 6/2015 | Jones et al. |
| 9,044,082 B2 | 6/2015 | Kusuma et al. |
| D739,731 S | 9/2015 | Jones |
| D739,732 S | 9/2015 | Jones |
| 9,156,583 B2 | 10/2015 | Howard et al. |
| D742,221 S | 11/2015 | Cassidu |
| D744,833 S | 12/2015 | Cotton |
| D744,861 S | 12/2015 | Fortner |
| D745,396 S | 12/2015 | Jahina et al. |
| D745,397 S | 12/2015 | Gogola et al. |
| D745,398 S | 12/2015 | Cotton |
| D745,399 S | 12/2015 | Cotton |
| D747,925 S | 1/2016 | Engler et al. |
| D749,838 S | 2/2016 | Romley |
| 9,254,514 B2 | 2/2016 | Farnham |
| D751,922 S | 3/2016 | Ramsey et al. |
| 9,321,555 B2 | 4/2016 | Roodnat et al. |
| D756,705 S | 5/2016 | Abrams et al. |
| D756,709 S | 5/2016 | Weitman |
| 9,327,899 B2 | 5/2016 | Greenfield et al. |
| 9,340,345 B2 | 5/2016 | Leser et al. |
| 9,358,604 B2 | 6/2016 | Jentzsch et al. |

(56) References Cited

U.S. PATENT DOCUMENTS

| | | |
|---|---|---|
| D763,621 S | 8/2016 | Szymanski |
| D764,231 S | 8/2016 | Szymanski |
| 9,440,410 B2 | 9/2016 | Marshall |
| D769,069 S | 10/2016 | Sanbar |
| 9,468,971 B2 | 10/2016 | Yamagata et al. |
| D772,079 S | 11/2016 | Ramsey et al. |
| D772,080 S | 11/2016 | Ramsey |
| D772,713 S | 11/2016 | Chapman et al. |
| D772,726 S | 11/2016 | Ramsey |
| 9,499,327 B2 | 11/2016 | D'Amato |
| D779,974 S | 2/2017 | Florkeiwicz et al. |
| D779,975 S | 2/2017 | Arranz et al. |
| D780,601 S | 3/2017 | Arranz et al. |
| 9,617,043 B2 | 4/2017 | McGirr et al. |
| D786,703 S | 5/2017 | Chapman et al. |
| D789,745 S | 6/2017 | Rashid et al. |
| D790,277 S | 6/2017 | Mackesy, II et al. |
| 9,700,929 B2 | 7/2017 | Fedusa et al. |
| 9,713,906 B2 | 7/2017 | Chapman et al. |
| D795,650 S | 8/2017 | Weitman |
| D796,905 S | 9/2017 | Kestenbaum |
| D797,510 S | 9/2017 | Ke |
| D797,512 S | 9/2017 | O'Connor |
| 9,758,292 B2 | 9/2017 | Leser et al. |
| 9,758,293 B2 | 9/2017 | Leser et al. |
| 9,771,206 B2 | 9/2017 | Marshall |
| D799,268 S | 10/2017 | Gschwandtl et al. |
| 9,783,359 B2 | 10/2017 | D'Amato |
| 9,789,992 B2 | 10/2017 | Fortner |
| D808,271 S | 1/2018 | Weyer et al. |
| 9,868,564 B2 | 1/2018 | McGirr et al. |
| 9,895,737 B2 | 2/2018 | Caunter et al. |
| 9,902,552 B2 | 2/2018 | Bilko |
| D813,606 S | 3/2018 | O'Nan et al. |
| 9,932,152 B2 | 4/2018 | Combe |
| 10,099,840 B2 | 10/2018 | Frost et al. |
| D833,224 S | 11/2018 | Wahlkvist |
| 10,239,648 B2 | 3/2019 | Lord et al. |
| D845,394 S | 4/2019 | Max et al. |
| D849,596 S | 5/2019 | Crosby |
| 10,286,437 B2 | 5/2019 | Golding |
| 10,478,000 B2 | 11/2019 | Choi et al. |
| 10,479,544 B2 | 11/2019 | Crosby et al. |
| D871,151 S | 12/2019 | Hudson |
| D903,424 S | 12/2020 | Scott |
| D906,056 S | 12/2020 | Scott |
| 10,875,076 B2 | 12/2020 | Scott |
| D910,376 S | 2/2021 | Lovelace |
| 11,059,086 B2 | 7/2021 | Dunwoody |
| D937,631 S | 12/2021 | O'Connor |
| D939,896 S | 1/2022 | Brownsberger et al. |
| 11,224,428 B2 | 1/2022 | Scott et al. |
| D962,702 S | 9/2022 | Holstine et al. |
| 11,883,872 B2 | 1/2024 | Dunwoody |
| D1,020,459 S | 4/2024 | Nortwick |
| 2004/0031714 A1 | 2/2004 | Hanson |
| 2005/0006395 A1 | 1/2005 | Reed et al. |
| 2005/0061821 A1 | 3/2005 | Bone et al. |
| 2005/0189361 A1 | 9/2005 | Bresler |
| 2005/0230401 A1 | 10/2005 | Hanson |
| 2006/0277957 A1 | 12/2006 | Fujishige et al. |
| 2007/0029320 A1 | 2/2007 | Boule et al. |
| 2007/0295051 A1 | 12/2007 | Myers et al. |
| 2008/0128481 A1 | 6/2008 | Robertson |
| 2008/0257895 A1 | 10/2008 | Broselow |
| 2009/0026214 A1 | 1/2009 | Yuan et al. |
| 2010/0247830 A1 | 9/2010 | Hernandez |
| 2011/0248040 A1 | 10/2011 | McGregor |
| 2011/0303659 A1 | 12/2011 | Perlman |
| 2012/0181205 A1 | 7/2012 | Alvares et al. |
| 2012/0282482 A1 | 11/2012 | Flehmig et al. |
| 2014/0048440 A1 | 2/2014 | Prickett, Jr. |
| 2014/0097191 A1 | 4/2014 | Alvares et al. |
| 2014/0166655 A1 | 6/2014 | Combe |
| 2014/0308407 A1 | 10/2014 | Ramsey et al. |
| 2014/0374428 A1 | 12/2014 | Watson et al. |
| 2015/0041480 A1 | 2/2015 | Ramsey |
| 2015/0122817 A1 | 5/2015 | Maxwell-Wood |
| 2015/0208839 A1 | 7/2015 | Shalmoni |
| 2015/0216341 A1 | 8/2015 | Shimono |
| 2015/0257559 A1 | 9/2015 | Shalmoni |
| 2015/0289691 A1 | 10/2015 | Azuma et al. |
| 2015/0343516 A1 | 12/2015 | Schremmer et al. |
| 2015/0344166 A1 | 12/2015 | Davis et al. |
| 2016/0031594 A1 | 2/2016 | Ramsey et al. |
| 2016/0075503 A1 | 3/2016 | Ramsey et al. |
| 2016/0340104 A1 | 11/2016 | Rodriguez |
| 2016/0368650 A1 | 12/2016 | Davis et al. |
| 2017/0050800 A1 | 2/2017 | Gain |
| 2017/0095852 A1 | 4/2017 | Carstens et al. |
| 2017/0251852 A1 | 9/2017 | O'Nan et al. |
| 2017/0267415 A1 | 9/2017 | Olson et al. |
| 2017/0305647 A1 | 10/2017 | Golding |
| 2018/0044074 A1 | 2/2018 | Combe et al. |
| 2018/0057247 A1 | 3/2018 | Marshall |
| 2018/0127195 A1 | 5/2018 | Ramsey |
| 2018/0134460 A1 | 5/2018 | Ramsey |
| 2018/0140118 A1 | 5/2018 | Ma |
| 2018/0141799 A1 | 5/2018 | Song |
| 2018/0194517 A1 | 7/2018 | Brooks |
| 2018/0221936 A1† | 8/2018 | Scott |
| 2018/0228314 A1 | 8/2018 | Putnam |
| 2019/0039114 A1 | 2/2019 | Zhang |
| 2019/0112100 A1* | 4/2019 | Scott ............... B21D 51/26 |
| 2019/0216245 A1 | 7/2019 | Choi et al. |
| 2020/0106433 A1 | 4/2020 | Yamato et al. |
| 2020/0108433 A1 | 4/2020 | Scott |
| 2022/0281631 A1 | 9/2022 | Nortwick et al. |
| 2023/0047517 A1 | 2/2023 | Holstine et al. |
| 2024/0123483 A1 | 4/2024 | Dunwoody |

FOREIGN PATENT DOCUMENTS

| | | |
|---|---|---|
| CA | 143472 | 6/2012 |
| CA | 143473 | 6/2012 |
| CA | 143474 | 6/2012 |
| CA | 145174 | 3/2013 |
| CA | 145175 | 3/2013 |
| CA | 145176 | 3/2013 |
| CA | 148031 | 11/2013 |
| CA | 148032 | 11/2013 |
| CA | 150408 | 1/2014 |
| CA | 150409 | 1/2014 |
| CA | 152297 | 5/2014 |
| CA | 152298 | 5/2014 |
| CA | 171072 | 7/2017 |
| CA | 174457 | 7/2017 |
| CA | 184556 | 7/2020 |
| CA | 184558 | 12/2020 |
| CN | 2475320 | 2/2002 |
| CN | 2617692 | 5/2004 |
| CN | 2751691 | 1/2006 |
| CN | 2930414 | 8/2007 |
| CN | 101479057 | 7/2009 |
| CN | 101704423 | 5/2010 |
| CN | 201551057 | 8/2010 |
| CN | 201602531 | 10/2010 |
| CN | 301703429 | 10/2011 |
| CN | 202681458 | 1/2013 |
| CN | 202722936 | 2/2013 |
| CN | 202950502 | 5/2013 |
| CN | 302879259 | 7/2014 |
| CN | 104907451 | 9/2015 |
| CN | 205144216 | 4/2016 |
| CN | 304002030 | 1/2017 |
| CN | 304190293 | 6/2017 |
| CN | 206466360 | 9/2017 |
| CN | 304264046 | 9/2017 |
| CN | 304470935 | 1/2018 |
| CN | 304581848 | 4/2018 |
| CN | 207956318 | 10/2018 |
| CN | 209003460 | 5/2019 |
| CN | 209152977 | 7/2019 |
| CN | 209252321 | 8/2019 |

(56) References Cited

FOREIGN PATENT DOCUMENTS

| | | |
|---|---:|---:|
| CN | 209421623 | 9/2019 |
| CN | 305748955 | 5/2020 |
| CN | 305786241 | 5/2020 |
| CN | 305865227 | 6/2020 |
| CN | 306567623 | 5/2021 |
| CN | 308177468 | 8/2023 |
| CO | 11296 | 4/2020 |
| CO | 11301 | 4/2020 |
| CO | 11302 | 4/2020 |
| DE | 2312116 | 2/1982 |
| DE | 2639154 | 4/1985 |
| DE | 2554907 | 8/1987 |
| DE | 3418849 | 8/1992 |
| DE | 29920952 | 3/2000 |
| DE | 10-2006-053325 | 2/2016 |
| EA | 021215 | 4/2015 |
| EM | 005827813-0004 | 1/2019 |
| EM | 005827813-0007 | 1/2019 |
| EM | 005827813-0030 | 1/2019 |
| EM | 005827813-0033 | 1/2019 |
| EM | 005827813-0042 | 1/2019 |
| EM | 005827813-0044 | 1/2019 |
| EP | 0090639 | 10/1983 |
| EP | 0076807 | 12/1985 |
| EP | 0460739 | 12/1991 |
| EP | 0852974 | 4/2002 |
| EP | 1254842 | 6/2004 |
| EP | 1529575 | 5/2005 |
| EP | 1876107 | 1/2008 |
| EP | 1876106 | 10/2008 |
| EP | 2623429 | 8/2013 |
| EP | 2662295 | 11/2013 |
| EP | 2662296 | 11/2013 |
| EP | 2768741 | 8/2014 |
| EP | 2958812 | 1/2017 |
| EP | 005828225-0001 | 11/2018 |
| EP | 005828225-0002 | 11/2018 |
| EP | 005828225-0003 | 11/2018 |
| EP | 005828225-0004 | 11/2018 |
| EP | 3666677 | 6/2020 |
| EP | 3411164 | 8/2021 |
| EP | 3925717 | 12/2021 |
| ES | I0102057 | 4/1983 |
| FR | 1283044 | 1/1962 |
| FR | 1376764 | 10/1964 |
| FR | 1490636 | 8/1967 |
| FR | 2177714 | 11/1973 |
| FR | 2229243 | 12/1974 |
| FR | 2758703 | 7/1998 |
| FR | 2926797 | 12/2012 |
| FR | 2988377 | 9/2013 |
| FR | 2993868 | 1/2014 |
| GB | 558436 | 1/1944 |
| GB | 971077 | 9/1964 |
| GB | 976178 | 11/1964 |
| GB | 1096451 | 12/1967 |
| GB | 1261531 | 1/1972 |
| GB | 1261816 | 1/1972 |
| GB | 1376603 | 12/1974 |
| GB | 1458505 | 12/1976 |
| GB | 2075462 A † | 11/1981 |
| GB | 2077177 | 12/1981 |
| GB | 2131334 | 6/1984 |
| GB | 2484149 | 4/2012 |
| GB | 2547016 | 8/2017 |
| GB | 90058278130002 | 1/2019 |
| GB | 90058278130042 | 1/2019 |
| GB | 6109969 | 12/2020 |
| GB | 6161121 | 9/2021 |
| GB | 6212472 | 6/2022 |
| GB | 6212473 | 6/2022 |
| GB | 6212474 | 6/2022 |
| GB | 6212475 | 6/2022 |
| GB | 6261810 | 2/2023 |
| HK | 1254165 | 7/2019 |
| ID | A 10201400234-0001 | 2/2014 |
| IN | 335372-001 | 11/2020 |
| IT | 2015000081014 | 7/2016 |
| JP | S46-002436 | 1/1971 |
| JP | S57-008651 | 1/1982 |
| JP | S57-187121 | 11/1982 |
| JP | S57-502149 | 12/1982 |
| JP | S63-040327 | 3/1988 |
| JP | S63-183738 | 7/1988 |
| JP | H01-150418 | 6/1989 |
| JP | H03-126834 | 12/1991 |
| JP | H04-253639 | 9/1992 |
| JP | H06-502828 | 3/1994 |
| JP | 2610958 | 5/1997 |
| JP | H09-508086 | 8/1997 |
| JP | 2869683 | 3/1999 |
| JP | 3582319 | 10/2004 |
| JP | 3614244 | 1/2005 |
| JP | 2005-280757 | 10/2005 |
| JP | 2006-224108 | 8/2006 |
| JP | 2006-224113 | 8/2006 |
| JP | 2008-195417 | 8/2008 |
| JP | 2009-541066 | 11/2009 |
| JP | 2012-161844 | 8/2012 |
| JP | 5120807 | 1/2013 |
| JP | 5262872 | 8/2013 |
| JP | 2015-506842 | 3/2015 |
| JP | 5985655 | 9/2016 |
| JP | 2020-508874 | 3/2020 |
| KR | 300526059.0000 | 4/2009 |
| KR | 1228537 | 3/2013 |
| KR | 301007340.0000 | 9/2019 |
| KR | 301069996.0000 | 8/2020 |
| PE | 003092-2018 | 2/2019 |
| PE | 5416 | 2/2019 |
| RU | 2016146995 | 7/2018 |
| TH | 81156 | 11/2006 |
| TH | 119302 | 1/2013 |
| TW | 201116456 | 5/2011 |
| TW | 201117754 | 6/2011 |
| WO | WO 82/03576 | 10/1982 |
| WO | WO 96/00169 | 1/1996 |
| WO | WO 99/59896 | 11/1999 |
| WO | WO 2005/085074 | 9/2005 |
| WO | WO 2009/090224 | 7/2009 |
| WO | WO 2009/115377 | 9/2009 |
| WO | WO 2009/130043 | 10/2009 |
| WO | WO 2010/128161 | 11/2010 |
| WO | WO 2011/004013 | 1/2011 |
| WO | WO 2011/023644 | 3/2011 |
| WO | WO 2011/053776 | 5/2011 |
| WO | WO 2012/056018 | 5/2012 |
| WO | WO 2012/136677 | 10/2012 |
| WO | WO 2013/010875 | 1/2013 |
| WO | WO 2013/068292 | 5/2013 |
| WO | WO 2013/096636 | 6/2013 |
| WO | WO 2013/124418 | 8/2013 |
| WO | WO 2013/164482 | 11/2013 |
| WO | WO 2013/190264 | 12/2013 |
| WO | WO D084703 | 10/2014 |
| WO | WO 2015/177167 | 11/2015 |
| WO | WO 2015/181792 | 12/2015 |
| WO | WO 2016/166112 | 10/2016 |
| WO | WO 2016/192397 | 12/2016 |
| WO | WO 2017/134413 | 8/2017 |
| WO | WO 2018/052973 | 3/2018 |
| WO | WO 2018/109110 | 6/2018 |
| WO | WO 2018/147916 | 8/2018 |
| WO | WO 2021/192671 | 9/2021 |
| WO | WO 2022/064837 | 3/2022 |
| WO | WO 2013/002363 | 1/2023 |

OTHER PUBLICATIONS

Notice of Allowance for Australia Patent Application No. 2019396327, dated Jul. 12, 2022, 4 pages.

(56) References Cited

OTHER PUBLICATIONS

Notice of Allowance for Mexico Patent Application No. MX/f/2021/000126, dated Jun. 9, 2022, 3 pages.
Official Action (with English translation) for Japan Patent Application No. 2022-005051, dated Jun. 28, 2022, 6 pages.
Official Action (with English translation) for Japan Patent Application No. 2022-005052, dated Jun. 28, 2022, 6 pages.
Official Action (with English translation) for Japan Patent Application No. 2022-005053, dated Jun. 14, 2022, 3 pages.
Official Action for Australia Patent Application No. 202213292, dated Jul. 14, 2022, 3 pages.
Official Action for U.S. Appl. No. 16/703,558, dated Jul. 1, 2022, 18 pages.
Notice of Allowance for U.S. Appl. No. 29/695,988, dated Jul. 11, 2022, 7 pages.
Official Action (with English translation) for India Patent Application No. 201917033122, dated Mar. 7, 2023, 2 pages.
Revised Official Action (with English translation) for India Patent Application No. 201917033122, dated Mar. 22, 2023, 2 pages.
Official Action for Brazil Patent Application No. 112021010450-0, dated Apr. 11, 2023, 5 pages.
Notice of Allowance for Canada Patent Application No. 3122264, dated Apr. 17, 2023, 1 page.
Official Action (with unofficial translation) for Vietnam Patent Application No. 3-2019-01441, dated Apr. 7, 2023, 12 pages.
Official Action for Canada Patent Application No. 202418, dated Feb. 23, 2023, 2 pages.
Official Action for Canada Patent Application No. 218095, dated Feb. 23, 2023, 4 pages.
Official Action (with English translation) for Japan Patent Application No. 2022-005053, dated Apr. 4, 2023, 4 pages.
Notice of Allowance (no English translation available) for Mexico Patent Application No. MX/f/2021/000953, dated Mar. 28, 2023, 3 pages.
U.S. Appl. No. 29/648,903, filed May 24, 2018, Scott et al.
U.S. Appl. No. 29/695,988, filed Jun. 24, 2019, Whitmore et al.
U.S. Appl. No. 29/724,469, filed Feb. 14, 2020, Scott.
U.S. Appl. No. 29/741,758, filed Jul. 15, 2020, Whitmore et al.
U.S. Appl. No. 29/764,090, filed Dec. 28, 2020, Scott.
U.S. Appl. No. 29/771,364, filed Feb. 22, 2021, Fitzsimons.
"[100 Sets—16 oz] Plastic Cups with Flat Lids," Amazon, 2016, retrieved from http://amazon.com/Comfy-Package-50-Sets-Crystal/dp/B01DS7OZP2/ref=psdc_15757581_14_B01HHQ40IC, 10 pages.
"[25 PACK] 16 oz Cups | Iced Coffee Go Cups and Sip Through Lids | Cold Smoothie | Plastic Cups with Sip Through Lids | Clear Plastic Disposable Pet Cups | Ideal for Parfait, Juice, Soda, Party Cups," Amazon, 2021, retrieved from https://www.amazon.com/Through-Smoothie-Plastic-Disposable-Parfait/dp/B08W2424DM/, 6 pages.
"Ball Debuts First-Ever Aluminum Cup as Consumer Demand for Sustainable Packaging Grows," PR Newswire, Aug. 27, 2019, retrieved from https://www.prnewswire.com/news-releases/ball-debuts-first-ever-aluminum-cup-as-consumer-demand-for-sustainable-packaging-grows-300907200.html, 4 pages.
"CFC Party Cups," Performa CFC Ideas, Aug. 29, 2014, retrieved from https://proformacfcideas.com/2014/08/29/cfc-party-cups/, 1 page.
"Coors Light Mar. 2019 Hoops Aluminum 22 Ounce Cups—New!," eBay, 2019, retrieved from https://www.ebay.com/itm/255030542590?, 3 pages.
"DART—Paper & Plastic Cups, Plates, Bowls & Utensils; Breakroom Accessory Type: Plastic Cold Cups ; Breakroom Accessory Description: Cups-Cold Drink; Plastic ; Color: White," MSC Direct, 2021, retrieved from https://www.mscdirect.com/product/details/17128406, 1 page.
"King of Beer Pong Stainless Steel Beer Pong Cups," Tailgating Ideas, © 2017, 8 pages [retrieved online from: www.tailgatingideas.com/king-of-beer-pong-stainless-steel-beer-pong-cups/].
"One More Time!," Pirani Life on Facebook, Jun. 13, 2019, retrieved from https://www.facebook.com/piranilife/photos/a.181707952414777/38934209025483, 1 page.

"Plastic Cups stock photo," iStock, Nov. 18, 2017, retrieved from https://www.istockphoto.com/photo/plastic-cups-gm876022646-244531648, 2 pages.
"Red Cup Living Reusable Red Plastic Cups—32 oz Party Cups—Extra Sturdy Big Red Cups—BPA Free and Washable—The Ideal Large Plastic Cups for Parties, BBQ, and Camping," Amazon.com, Jun. 27, 2012, retrieved from https://www.amazon.com/Red-Cup-Living-Reusable-Beverage/dp/B008FD8KD8, 10 pages.
"Solo 20 Red Cups Original 16oz-50cl" My American Market, Feb. 22, 2017, 1 page.
"Solo Cup 16 oz. Plastic Cold Party Cups," Amazon, 2016, retrieved from https://www.amazon.com/Solo-Cold-Plastic-Party-Ounce/dp/B01G2EOFXU, 7 pages.
"Stack Man Red [16 oz-100 Pack] Party, Cold Drink Plastic Disposable Cups," Amazon, 2016, retrieved from https://www.amazon.com/Stack-Man-Cold-Plastic-Party/dp/B071H84S86/ref=sr_1_1?dchild=1&keywords=Stack+Man+Red+%5B16+oz-100+Pack%5D+Party%2C+Cold+Drink+Plastic+Disposable+Cups&qid=1591037472&sr=8-1, 14 pages.
"The new #BallAluminumCup recycles infinitely without losing quality." Ball Aluminum Cup on Facebook, Oct. 22, 2019, retrieved from https://www.facebook.com/BallAluminumCup/photos/141931017202686, 1 page.
"Those who signed up for #PanthersPalooza will also be receiving these reusable and commemorative red solo cups!," Florida Panthers on Twitter, Jan. 12, 2018, retrieved from https://twitter.com/flapanthers/status/951920540666814465, 1 page.
Bouchard, "The Evolution of the Red Cup," Food by Skyler, Mar. 13, 2013, retrieved from https://foodbyskyler.wordpress.com/2013/03/13/the-evolution-of-the-red-cup/, 4 pages.
Choness, "Red Beer Pong plastic cups with ball isolated on white background," iStock, Jun. 15, 2019, retrieved from https://www.istockphoto.com/photo/red-beer-pong-plastic-cups-with-ball-isolated-on-white-background-traditional-gm115721554-314746084, 2 pages.
Eagle, "Ball to pilot disposable aluminum cups as an alternative to plastic," Beverage Daily, Aug. 29, 2019, retrieved from https://www.beveragedaily.com/Article/2019/08/29/Ball-to-pilot-disposable-aluminum-cups-as-an-alternative-to-plastic#, 1 page.
Kremer, "10 photos: Colorful kitchen styles," Des Moines Register, Jul. 25, 2013, retrieved from https://www.desmoinesregister.com/picture-gallery/life/style/2014/07/25/10-photos-colorful-kitchen-styles/13171713/, 2 pages.
Rense, "Ball Is Making Aluminum Beer Pong Cups That Are 'Infinitely Recyclable'," Esquire Magazine, Aug. 29, 2019, retrieved from https://www.esquire.com/food-drink/drinks/a28842420/ball-aluminum-cups-sustainability-beer-pong/, 2 pages.
Stirrup, Azure Tools and Technologies Cheat Sheet, Jenstirrup.com, Aug. 31, 2017, retrieved from https://jenstirrup.com/2017/08/, 1 page.
International Search Report and Written Opinion for International (PCT) Patent Application No. PCT/US2017/062582, dated Feb. 1, 2018 10 pages.
International Preliminary Report on Patentability for International (PCT) Patent Application No. PCT/US2017/062582, dated Aug. 22, 2019, 9 pages.
Official Action for Australian Patent Application No. 2017398102, dated May 4, 2020, 4 pages.
Notice of Allowance for Australian Patent Application No. 2017398102, dated Oct. 13, 2020, 4 pages.
Official Action (with English translation) for Brazil Patent Application No. BR112019016221-6, dated Jul. 27, 2021, 5 pages.
Official Action for Canadian Patent Application No. 3052955, dated Dec. 9, 2020, 8 pages.
Official Action for Canadian Patent Application No. 3052955, dated Jun. 7, 2021, 8 pages.
Official Action (with English translation) for Chinese Patent Application No. 201780088249.4, dated Jul. 3, 2020, 24 pages.
Official Action (with English translation) for Chinese Patent Application No. 201780088249.4, dated Feb. 22, 2021, 27 pages.
Official Action (with English translation) for Chinese Patent Application No. 201780088249.4, dated Aug. 23, 2021, 20 pages.
Extended European Search Report for European Patent Application No. 17896272.6, dated Nov. 19, 2020, 8 pages.

(56) References Cited

OTHER PUBLICATIONS

Official Action (with English translation) for India Patent Application No. 201917033122, dated Jan. 14, 2021, 5 pages.
Third Party Observation (no English translation available) for Japanese Patent Application No. 2019-542624, dated Jun. 10, 2020, 1 page.
Third Party Observation (no English translation available) for Japanese Patent Application No. 2019-542624, dated Jul. 10, 2020, 1 page.
Official Action (with English translation) for Japanese Patent Application No. 2019-542624, dated Sep. 15, 2020, 7 pages.
Third Party Observation (no English translation available) for Japanese Patent Application No. 2019-542624, dated Dec. 28, 2020, 1 page.
Official Action (with English translation) for Japanese Patent Application No. 2019-542624, dated Jan. 12, 2021, 7 pages.
Third Party Observation (no English translation available) for Japanese Patent Application No. 2019-542624, dated Jan. 29, 2021, 1 page.
Notice of Allowance (no English translation available) for Japan Patent Application No. 2019-542624, dated Jul. 20, 2021, 3 pages.
Official Action (no English translation available) for Russian Patent Application No. 2019128003, dated Feb. 17, 2020 , 6 pages.
Decision to Grant (no English translation available) for Russian Patent Application No. 2019128003, dated May 27, 2020, 8 pages.
International Search Report and Written Opinion for International (PCT) Patent Application No. PCT/US2019/064905, dated Feb. 25, 2020, 11 pages.
International Preliminary Report on Patentability for International (PCT) Application No. PCT/US2019/064905, dated Jun. 24, 2021, 7 pages.
Official Action for Canadian Patent Application No. 184558, dated Oct. 22, 2019, 2 pages.
Official Action for Canadian Patent Application No. 184558, dated Jan. 31, 2020, 1 page.
Official Action for Canadian Patent Application No. 184556, dated Feb. 17, 2020, 4 pages.
Notice of Allowance for Chinese Patent Application No. 201830676015.9, dated Nov. 4, 2019, 5 pages.
Notice of Allowance for Mexican Patent Application No. MX/f/2018/003496, Feb. 18, 2020, 3 pages.
Official Action for Mexican Patent Application No. MX/f/2020/001191, dated Jun. 24, 2021, 10 pages.
Official Action for Russian Patent Application No. 2019500757, dated Aug. 9, 2019, 12 pages.
Official Action for Canadian Patent Application No. 187858, dated Jul. 7, 2020, 2 pages.
Official Action (no English translation available) for Chinese Patent Application No. 201930288129.0, dated Oct. 18, 2019, 2 pages.
Notice of Allowance (with English translation) for Chinese Patent Application No. 201930288129.0, dated Jan. 17, 2020, 5 pages.
Official Action (no English translation available) for Mexican Patent Application No. MX/f/2019/001329, dated Oct. 2, 2020, 5 pages.
Official Action (no English translation available) for Russian Patent Application No. 2019502325, dated Dec. 5, 2019, 3 pages.
Official Action (no English translation available) for Russian Patent Application No. 2019502325, dated Apr. 13, 2020, 4 pages.
Official Action (no English translation available) for Russian Patent Application No. 2019502327, dated Dec. 5, 2019, 3 pages.
Official Action (no English translation available) for Russian Patent Application No. 2019502327, dated Apr. 13, 2020, 4 pages.
Official Action for Australian Patent Application No. 201917418, dated Feb. 6, 2020, 3 pages.
Official Action for Canadian Patent Application No. 192020, dated Oct. 20, 2020, 3 pages.
Official Action (no English translation available) for Chinese Patent Application 201930722022.2, dated Apr. 20, 2020, 1 page.
Official Action (with English translation) for Chinese Patent Application 201930722022.2, dated Oct. 28, 2020, 5 pages.

Official Action (no English translation available) for Chinese Patent Application No. 202030799106.9, dated Jan. 11, 2021, 1 page.
Notice of Allowance (with English translation) for Chinese Patent Application No. 202030799106.9, dated Mar. 26, 2021, 5 pages.
Official Action (no English translation available) for Chinese Patent Application No. 202030800806.5, dated Jan. 11, 2021, 1 page.
Notice of Allowance (with English translation) for Chinese Patent Application No. 202030800806.5, dated Apr. 2, 2021, 5 pages.
Official Action (no English translation available) for Russian Patent Application No. 2019505890, dated Jan. 17, 2020, 2 pages.
Notice of Allowance (no English translation available) for Russian Patent Application No. 2019505890, dated Sep. 16, 2020.
Notice of Allowance (no English translation available) for Russian Patent Application No. 2020501691, dated Sep. 16, 2020, 28 pages.
Notice of Allowance (no English translation available) for Russian Patent Application No. 2020501693, dated Sep. 16, 2020, 28 pages.
Notice of Allowance (no English translation available) for Russian Patent Application No. 2020501694, dated Sep. 16, 2020, 28 pages.
Official Action for Australian Patent Application No. 202014455, dated Oct. 26, 2020, 4 pages.
Official Action for Canadian Patent Application No. 197658, dated Mar. 26, 2021, 2 pages.
Official Action (no English translation available) for Russian Patent Application No. 2020503627, dated Sep. 10, 2020, 2 pages.
Notice of Allowance (no English translation available; see drawings) for Russian Patent Application No. 2020503627, dated Apr. 5, 2021, 9 pages.
Official Action (no English translation available) for Thailand Patent Application No. 2002003694, dated Feb. 10, 2021, 2 pages.
Official Action for Australia Patent Application No. 202111837, dated May 18, 2021, 3 pages.
Official Acton (no English translation available) for Russian Patent Application No. 2021501615, dated Apr. 19, 2021, 2 pages.
Official Action for U.S. Appl. No. 15/811,032, dated Sep. 30, 2019, 6 pages. Restriction Requirement.
Official Action for U.S. Appl. No. 15/811,032, dated Jan. 30, 2020, 13 pages.
Official Action for U.S. Appl. No. 15/811,032, dated Jul. 28, 2020, 12 pages.
Notice of Allowance for U.S. Appl. No. 15/811,032, dated Nov. 4, 2020, 7 pages.
Official Action for U.S. Appl. No. 16/214,477, dated Aug. 3, 2020, 7 pages. Restriction Requirement.
Official Action for U.S. Appl. No. 16/214,477, dated Dec. 11, 2020, 9 pages.
Official Action for U.S. Appl. No. 16/214,477, dated Mar. 22, 2021, 13 pages.
Official Action for U.S. Appl. No. 16/214,477, dated Jul. 23, 2021, 11 pages.
Ex Parte Quayle Action for U.S. Appl. No. 29/648,897, dated May 21, 2020, 8 pages.
Notice of Allowance for U.S. Appl. No. 29/648,897, dated Jul. 20, 2020, 6 pages.
Official Action for U.S. Appl. No. 29/648,903, dated Oct. 6, 2020, 9 pages. Restriction Requirement.
Official Action for U.S. Appl. No. 29/648,903, dated Feb. 19, 2021, 15 pages.
Official Action for U.S. Appl. No. 29/648,903, dated Aug. 11, 2021, 15 pages.
Official Action for U.S. Appl. No. 29/672,428, dated May 21, 2020, 8 pages.
Notice of Allowance for U.S. Appl. No. 29/672,428, dated Sep. 2, 2020, 6 pages.
Official Action for U.S. Appl. No. 29/695,988, dated Nov. 2, 2021, 12 pages. Restriction Requirement.
Official Action for U.S. Appl. No. 29/724,469, dated Sep. 1, 2021, 12 pages.
Official Action for U.S. Appl. No. 29/741,758, dated Sep. 16, 2021, 9 pages. Restriction Requirement.
U.S. Appl. No. 29/818,397, filed Dec. 8, 2021, Whitmore et al.
Official Action (no English translation available) for Peru Patent Application No. 1550-2019, dated Dec. 10, 2012, 5 pages.

(56) References Cited

OTHER PUBLICATIONS

Official Action (with English translation) for Japan Patent Application No. 2021-006668, dated Dec. 14, 2021, 3 pages.
Notice of Allowance (no English translation available) for Russian Patent Application No. 2021501615, dated Dec. 1, 2021, 12 pages.
Notice of Allowance (no English translation available) for Russia Patent Application No. 2021503583, dated Dec. 1, 2021, 9 pages.
Notice of Allowance (no English translation available) for Russia Patent Application No. 2021503584, dated Dec. 1, 2021, 9 pages.
Notice of Allowance for U.S. Appl. No. 29/648,903, dated Dec. 24, 2021, 9 pages.
Official Action for U.S. Appl. No. 29/741,758, dated Jan. 4, 2022, 9 pages.
Notification of Reexamination for China Patent Application No. 201780088249.4, dated Jul. 24, 2024, 9 pages.
Intent to Grant Europe Patent Application No. 17896272.6, dated Mar. 19, 2024, 7 pages.
Official Action (with English translation) for Vietnam Patent Application No. 1-2022-04853, dated Mar. 28, 2024, 4 pages.
Official Action for Australia Patent Application No. 2022256184, dated Jun. 12, 2024, 4 pages.
Article 94(3) Communication for Europe Patent Application No. 19897147.5, dated Mar. 18, 2024, 4 pages.
Official Action for Mexico Patent Application No. MX/a/2021/006558, dated Jun. 14, 2024, 4 pages.
Notice of Allowance for Mexico Patent Application No. MX/a/2021/006558, dated Oct. 10, 2024, 3 pages.
Official Action (with English translation) for Thailand Patent Application No. 2101003156, dated Feb. 15, 2024, 4 pages.
Official Action (no English translation available) for Thailand Patent Application No. 1802005086, dated May 29, 2024, 8 pages.
Official Action (no English translation available) for Thailand Patent Application No. 1802005096, dated May 29, 2024, 7 pages.
Invalidation Decision (no English translation available) for China Patent Application No. 201930288129.0, dated Apr. 24, 2024, 6 pages.
Official Action (no English translation available) for Thailand Patent Application No. 1902002149, dated May 29, 2024, 8 pages.
Notification of Decision (no English translation available) for Thailand Patent Application No. 1902005264, dated Aug. 7, 2024, 8 pages.
Notification of Decision (no English translation available) for Thailand Patent Application No. 1902005267, dated Aug. 7, 2024, 7 pages.
Notification of Decision (no English translation available) for Thailand Patent Application No. 1902005268, dated Aug. 8, 2024, 7 pages.
Notification of Decision (no English translation available) for Thailand Patent Application No. 1902005269, dated Aug. 7, 2024, 8 pages.
Notification of Decision (no English translation available) for Thailand Patent Application No. 1902005270, dated Aug. 7, 2024, 8 pages.
Official Action (no English translation available) for Thailand Patent Application No. 2002003694, dated Mar. 24, 2024, 3 pages.
Official Action (no English translation available) for Thailand Patent Application No. 2002003694, dated Oct. 15, 2024, 6 pages.
Official Action for Canada Patent Application No. 216736, dated Jul. 2, 2024, 2 pages.
Official Action for Canada Patent Application No. 202418, dated Feb. 13, 2024, 3 pages.
Official Action for Canada Patent Application No. 202418, dated Jul. 2, 2024, 2 pages.
Official Action for Canada Patent Application No. 218095, dated Feb. 26, 2024, 3 pages.
Official Action for Canada Patent Application No. 218095, dated Jul. 3, 2024, 2 pages.
Official Action for China Patent Application No. 202130388488.0, dated Jun. 5, 2024, 2 pages.
Official Action for Canada Patent Application No. 213322, dated Mar. 7, 2024, 1 page.
Official Action for Canada Patent Application No. 228253, dated Feb. 21, 2024, 1 page.
Official Action for Australia Patent Application No. 2021371334, dated Apr. 5, 2024, 4 pages.
Official Action for Canada Patent Application No. 3196939, dated Sep. 23, 2024, 5 pages.
Extended European Search Report for Europe Patent Application No. 21887618.3, dated Aug. 30, 2024, 10 pages.
Official Action (with English Summary) for Japan Patent Application No. 2023-526190, dated Apr. 2, 2024, 9 pages.
International Preliminary Report on Patentability for International (PCT) Patent Application No. PCT/US2023/064938, dated Oct. 3, 2024, 8 pages.
Notice of Allowance for U.S. Appl. No. 17/832,241, dated Aug. 29, 2024, 8 pages.
Notice of Allowance for U.S. Appl. No. 29/863,700, dated May 17, 2024, 7 pages.
Notice of Allowance for U.S. Appl. No. 29/818,397, dated Mar. 15, 2024, 8 pages.
Third Party Observation (no English translation available) for Japan Patent Application No. 2021-081085, dated Dec. 1, 2022, 16 pages.
Official Action for Chinese (with English translation) Patent Application No. 201980087924.0, dated Oct. 21, 2022, 20 pages.
Official Action for Japan Patent Application No. 2021-006668, dated Aug. 31, 2022, 1 page.
Official Action (no English translation available) for Mexico Patent Application No. MX/f/2021/000953, dated Oct. 14, 2022, 6 pages.
Third Party Opposition to Peru Patent Application No. 1007-2022, dated Oct. 19, 2022, 51 pages.
Third Party Opposition (no English translation available) to Peru Patent Application No. 1455-2022, dated Oct. 19, 2022, 51 pages.
"Ball Aluminum Cup Recyclable Party Cups, 16 oz. Cup, 30 Cups Per Pack," Ball via Amazon.com, Aug. 3, 2020, retrieved from https://www.amazon.com/Ball-Aluminum-Ultimate-Recyclable-Cold-Drink/dp/B08FCXK64W?th=1, 9 pages.
Notice of Allowance (no English translation available) for Mexico Patent Application No. MX/a/2019/009302, dated Jun. 8, 2023, 3 pages.
Official Action (with unofficial translation) for Vietnam Patent Application No. 3-2018-02534, dated Apr. 7, 2023, 6 pages.
Official Action for China Patent Application No. 202130388488.0, dated Jul. 3, 2023, 1 page.
International Search Report and Written Opinion for International (PCT) Patent Application No. PCT/US2023/064938, dated Jul. 31, 2023, 13 pages.
Ex Parte Quayle Action for U.S. Appl. No. 29/771,364, dated Jun. 28, 2023, 10 pages.
Notice of Allowance for U.S. Appl. No. 29/771,364, dated Jun. 28, 2023, 10 pages.
"12oz 16oz Custom recycled aluminium cup for disposable recyclable aluminum cups," Global Sources, publication date unknown, retrieved Jan. 10, 2025 from https://www.globalsources.com/Aluminum-tumbler/disposable-aluminium-cup-1189197724p.htm, 6 pages.
"Aluminum Solo Cup," Concept Design Studios, publication date unknown, retrieved Jan. 10, 2025 from https://conceptdesignstudios.com/product/aluminum-cup, 4 pages.
"Business and Brands Red Plastic Cups, Disposable Cups 12oz (50 Pack) Cups, Red Party Cups for Birthday, Party,Picnics, Weddings, Christmas, Anniversary," Amazon, Aug. 28, 2022, 6 pages.
"Fit Meal Prep 50 Pack 12 oz Compostable Clear Cups with Flat Lids, Plant Based Recyclable Iced Coffee Cup, Disposable Eco-Friendly Cup for Juice, Milkshake, Bubble Boba, Beer, Tea," Amazon, Oct. 18, 2023, retrieved from https://www.amazon.ca/Compostable-Biodegradable-Recyclable-Disposable-Eco-Friendly/dp/B0CJ4W4PKZ?th=1, 10 pages.
"Recyclable 16 Oz. Aluminum Cup," Stubbies Promotions, publication date unknown, retrieved Jan. 10, 2025 from https://www.stubbiespromos.com/p/OCXOD-QBGVJ/recyclable-16-oz.-aluminum-cup, 1 page.

(56) References Cited

OTHER PUBLICATIONS

"Zuvo Red Cups for Party—12 OZ—Pack of 50 Disposable Cups—Perfect for Any Occasion—Red Party Cups," Amazon, Jun. 6, 2024, retrieved from https://www.amazon.sa/-/en/Zuvo-Red-Cups-Party-Disposable/dp/B0D4K52CY9?th=1, 4 pages.
Ganninger, "The Origin of the Red Party Cup," Medium, Nov. 8, 2018, retrieved from https://medium.com/knowledge-stew/the-origin-of-the-red-party-cup-be9caa9077e7, 2 pages.
Wiener-Bronner, "Starbucks to test recyclable, compostable cups," CNN, Mar. 21, 2019, retrieved from https://www.cnn.com/2019/03/20/business/starbucks-greener-cups/index.html, 8 pages.
Reexamination Decision (no English translation available) for China Patent Application No. 201780088249.4, dated Nov. 29, 2024, 10 pages.
Notice of Allowance (with English translation) for Vietnam Patent Application No. 1-2022-04853, dated Oct. 29, 2024, 2 pages.
Notice of Allowance for Australia Patent Application No. 2022256184, dated Dec. 18, 2024, 4 pages.
Official Action (with English translation) for Vietnam Patent Application No. 3-2019-03392, dated Sep. 26, 2024, 23 pages.
Third Party Observation for Japan Patent Application No. 2023-526190, dated Dec. 17, 2024, 11 pages.
Office Action for Japan Patent Application No. 2023-526190, dated Jan. 7, 2025, 5 pages.
Examiner's Answer to Appeal Brief for U.S. Appl. No. 16/703,558, dated Nov. 25, 2024, 11 pages.
Notice of Allowance for U.S. Appl. No. 29/855,742, dated Nov. 20, 2024, 7 pages.
Official Action for U.S. Appl. No. 29/954,412, dated Jan. 15, 2025, 12 pages.
Extended European Search Report for European Patent Application No. 19897147.5 dated Jul. 27, 2022, 7 pages.
Decision to Grant and Search Report (no English translation available) for Russia Patent Application No. 2021120173, dated Aug. 29, 2022, 12 pages.
Official Action for Canadian Patent Application No. 202418, dated Sep. 10, 2022, 2 pages.
Official Action (with English translation) for Japan Patent Application No. 2022-005053, dated Sep. 13, 2022, 5 pages.
Official Action (with English translation) for Japan Patent Application No. 2022-019079, dated Sep. 27, 2022, 17 pages.
Notice of Allowance for U.S. Appl. No. 29/741,758, dated Aug. 19, 2022, 9 pages.
Notice of Allowance for Australia Patent Application No. 2021200442, dated Jan. 13, 2023, 4 pages.
Notice of Reasons for Revocation (with English summary) for Japan Patent Application No. 2021-081085, dated Jan. 26, 2023, 12 pages.
Official Action (no English translation available) for Mexico Patent Application No. MX/a/2019/009302, dated Nov. 29, 2022, 5 pages.
Decision to Grant (no English translation available) for Japan Patent Application No. 2021-530957, dated Jan. 17, 2023, 3 pages.
Official Action for Canada Patent Application No. 200582, dated Jan. 27, 2023, 2 pages.
Official Action for Canada Patent Application No. 216736, dated Dec. 23, 2022, 2 pages.
Official Action (with English translation) for Japan Patent Application No. 2022-019079, dated Jan. 10, 2023, 5 pages.
Official Action (no English translation available) for Thailand Patent Application No. 2102001431, dated Jan. 6, 2023, 2 pages.
Official Action (no English translation available) for Thailand Patent Application No. 2102001432, dated Jan. 6, 2023, 2 pages.
Official Action (no English translation available) for Thailand Patent Application No. 2102001433, dated Jan. 6, 2023, 2 pages.
Official Action (no English translation available) for Thailand Patent Application No. 2102001434, dated Jan. 6, 2023, 2 pages.
Official Action (no English translation available) for Thailand Patent Application No. 2102001435, dated Jan. 6, 2023, 2 pages.
Official Action (no English translation available) for Thailand Patent Application No. 2102001436, dated Jan. 6, 2023, 2 pages.
Official Action (no English translation available) for Thailand Patent Application No. 2102001437, dated Jan. 6, 2023, 2 pages.
Official Action (no English translation available) for Thailand Patent Application No. 2102001438, dated Jan. 6, 2023, 2 pages.
Official Action (no English translation available) for Thailand Patent Application No. 2102001439, dated Jan. 6, 2023, 2 pages.
Official Action for U.S. Appl. No. 16/703,558, dated Feb. 14, 2023, 19 pages.
Official Action for Australia Patent Application No. 2021200442, dated Oct. 20, 2022, 3 pages.
Official Action for Canada Patent Application No. 3122264, dated Oct. 14, 2022, 3 pages.
Official Action for Canada Patent Application No. 200582, dated Jul. 30, 2022, 3 pages.
Notice of Allowance for U.S. Appl. No. 29/828,163, dated. Oct. 27, 2022, 7 pages.
Notice of Allowance for Mexico Patent Application No. MX/f/2022/001527, dated Sep. 28, 2022, 3 pages.
Notice of Allowance for Mexico Patent Application No. MX/f/2022/001528, dated Sep. 29, 2022, 3 pages.
Notice of Allowance for Mexico Patent Application No. MX/f/2022/001529, dated Sep. 29, 2022, 3 pages.
Notice of Allowance for Mexico Patent Application No. MX/f/2022/001530, dated Sep. 29, 2022, 3 pages.
Notice of Allowance for Mexico Patent Application No. MX/f/2022/001531, dated Sep. 29, 2022, 3 pages.
"Red Cup living 18 oz Cup, Reusable Plastic Cups | Extra Sturdy Big Red Plastic Tumbler, BPA Free Drinking Cup | Red Cup Style Plastic Cups Dishwasher Safe | The Large Drinking Glasses for BBQ—Set of 1," Amazon.com, 2012, retrieved from https://www.amazon.com/Red-Cup-Living-Reusable-Beverage/dp/B008FDEQ9U, 9 pages.
"Ball Aluminum Cup Review," Uploaded to YouTube by IPSCanmaking, Feb. 2020, retrieved from https://www.youtube.com/watch?v=z_9kWDjvi-Y, 1 page.
Official Action for Australia Patent Application No. 2021200442, dated Jan. 28, 2022, 3 pages.
Official Action for Canadian Patent Application No. 3052955, dated Feb. 11, 2022, 1 page.
Official Action for Australia Patent Application No. 2019396327, dated Feb. 9, 2022, 4 pages.
Official Action for India Patent Application No. 202117023324, dated Feb. 10, 2022, 4 pages.
Notice of Allowance for Mexico Patent Application No. MX/f/2020/001924, dated Feb. 3, 2021, 2 pages.
International Search Report and Written Opinion for International (PCT) Patent Application No. PCT/US2021/057296, dated Jan. 18, 2022, 2 pages.
Notice of Allowance for U.S. Appl. No. 16/214,477, dated Mar. 10, 2022, 9 pages.
Notice of Allowance for U.S. Appl. No. 16/214,477, dated Mar. 30, 2022, 3 pages.
Official Action for U.S. Appl. No. 29/764,090, dated Mar. 2, 2022, 9 pages.
Official Action for U.S. Appl. No. 29/695,988, dated Mar. 15, 2022, 12 pages.
Notice of Allowance (with English translation) for Japan Patent Application No. 2021-081085, dated Apr. 5, 2022, 6 pages.
Official Action (no English translation available) for Russia Patent Application No. 2021120173, dated Mar. 31, 2022, 7 pages.
Official Action (with English translation) for Japan Patent Application No. 2021-006668, dated Mar. 22, 2022, 6 pages.
International Search Report and Written Opinion for International (PCT) Patent Application No. PCT/US2021/057296, dated Mar. 22, 2022, 2 pages.
Notice of Allowance for U.S. Appl. No. 29/764,090, dated May 2, 2022, 7 pages.
Official Action for U.S. Appl. No. 29/741,758, dated Apr. 25, 2022, 6 pages.
Official Action (with English translation) for Chinese Patent Application No. 201780088249.4, dated Nov. 30, 2021, 19 pages.
Notice of Allowance for Mexican Patent Application No. MX/f/2020/001191, dated Nov. 3, 2021, 3 pages.

(56) References Cited

OTHER PUBLICATIONS

Notice of Allowance for Mexico Patent Application No. MX/f/2019/003721, dated Nov. 10, 2021, 3 pages.
Invitation to Pay Additional Fees for International (PCT) Patent Application No. PCT/US2021/057296, dated Jan. 18, 2022, 2 pages.
Notice of Allowance for U.S. Appl. No. 29/724,469, dated Jan. 26, 2022, 7 pages.
"Premier Syltz Brand Red Plastic Shot Glass—2 oz.," Amazon.com, 2014, retrieved from https://www.amazon.com/oz-Plastic-Shot-Glasses-20ct/dp/B00L1JXEDO, 9 pages.
Notice of Allowance (no English translation available) for Thailand Patent Application No. 1901004840, dated Nov. 19, 2023, 1 page.
Request for Invalidation (no English translation available) for China Patent Application No. 201830676015.9, dated Oct. 27, 2023, 48 pages.
Official Action (with English translation) for Japan Patent Application No. 2022-019079, dated Jun. 20, 2023, 4 pages.
Official Action for Canada Patent Application No. 213322, dated Nov. 17, 2023, 3 pages.
Notice of Allowance for Mexico Patent Application No. MX/f/2022/001591, dated Oct. 4, 2023, 3 pages.
Official Action for U.S. Appl. No. 29/818,397, dated Dec. 7, 2023, 8 pages. Restriction Requirement.
"Blue Disposable Plastic Cups—72ct—up & up," Target, Publication Date Unknown, retrieved May 18, 2022 from https://www.target.com/p/blue-dispoable-plastic-cups-72ct-up-38-up-8482/-/A-52013769#lnk-sametab, 7 pages.
"The infinitely recyclable #BallAluminumCup delivers an elevated drinking experience, and equally as exciting sustainability benefits," Posted on Facebook by Ball Corporation, Oct. 10, 2019, retrieved from https://www.facebook.com/BallCorpHQ/photos/a.90834519678/10157711493134679, 1 page.
Official Action (with English translation) for Japan Patent Application No. 2021-530957, dated May 31, 2022, 5 pages.
Official Action for U.S. Appl. No. 29/828,163, dated May 25, 2022, 15 pages.
"24 oz 50 sets Plastic Cups with Lids BPA Free Clear Plastic Cups Disposable Coffee Cups Clear Cups for Water Soda Juice Drinking Cups & Lids for Office, Shop & Restaurant," Amazon, 2023, retrieved from https://www.amazon.com/Plastic-Disposable-Coffee-Drinking-Restaurant/dp/B0BWBYQYN3?th=1, 8 pages.
"Aluminum Cups," Fly Tin Bottle, 2022, retrieved from https://web.archive.org/web/20220520003842/https://www.flytinbottle.com/aluminum-cups/, 108 pages.
"Ball Aluminum Cup Recyclable Party Cups—20oz/10ct," Target, 2022, retrieved from https://www.target.com/p/ball-aluminum-cup-recyclable-party-cups-20oz-10ct/-/A-82242697, 9 pages.
"Color-Changing Metal Tumbler Portable Disposable Reusable Business Beer Glass Wholesale Frozen Drink Tumbler Magic Aluminum Cups," Alibaba, 2022, retrieved from https://www.alibaba.com/product-detail/Color-Changing-Metal-Tumbler-Portable-Disposable_1600444294435.html, 16 pages.
"Comfy Package Disposable Party Plastic Cups [100 Pack—18 oz.] Red Drinking Cups," Amazon, 2021, retrieved from https://www.amazon.com/Disposable-Party-Plastic-Cups-Pack/dp/B09J6JXG2F, 10 pages.
"Custom Colored Party Cup Promotional Disposable Aluminum Drinking Cup Beer Metal Tumbler Reusable Aluminum Cup," Alibaba, 2023, retrieved from https://www.alibaba.com/product-detail/Custom-Colored-Party-Cup-Promotional-Disposable_1600608447672.html, 18 pages.
"Disposable Aluminum Cold Drink Cup Beer Metal Tumbler Reusable Aluminum Party Cups," Made In China, 2024, retrieved from https://kingskong.en.made-in-china.com/product/qthUbVQoaEcW/China-Disposable-Aluminum-Cold-Drink-Cup-Beer-Metal-Tumbler-Reusable-Aluminum-Party-Cups.html, 11 pages.
"Disposable Aluminum Cup Metal Aluminum Tumbler Cups Wholesale Gift Drinking Mug with Custom Silkscreen Logo," Made In China, 2024, retrieved from https://hzjinjin.en.made-in-china.com/product/fFZAQWYyhlhG/China-Disposable-Aluminum-Cup-Metal-Aluminum-Tumbler-Cups-Wholesale-Gift-Drinking-Mug-with-Custom-Silkscreen-Logo.html, 11 pages.
Lounsweer 100 Pack 16 Ounce Plastic Cups Heavy Duty Drinking Cups Disposable Cups Party Cups Water Cups for Graduation Drinks Soda Punch Barbecues Picnics (Gold), Amazon, 2022, retrieved from https://www.amazon.com/Lounsweer-Drinking-Disposable-Graduation-Barbecues/dp/B0BNH6PF2F?th=1, 8 pages.
"Steel Chill Cups," Silgan Containers LLC, 2022, retrieved from https://web.archive.org/web/20221006170106/https://steelchillcups.com/, 6 pages.
"Zelbeez Chill Aluminum Cups, Dishwasher Safe, 16 oz. Color Coated Cups, 100% Recyclable Aluminum Cups, Reusable and Disposable, Set of 12 Cups & Sleeves (Arctic Red)," Amazon, Apr. 12, 2023, retrieved from https://www.amazon.com/Zelbeez-Aluminum_Dishwasher-Recyclable-Disposable/dp/B0C1P7RY4S?th=1, 9 pages.
Official Action for India Patent Application No. 202117023324, dated Dec. 12, 2023, 3 pages.
Notice of Oral Hearing (no English translation available) for China Patent Application No. 201930288129.0, dated Jan. 24, 2023, 10 pages.
Notice of Allowance (no English translation available) for Thailand Patent Application No. 1902005263, dated Dec. 8, 2023, 1 page.
Official Action (no English translation available) for Thailand Patent Application No. 1902005264, dated Dec. 15, 2023, 3 pages.
Notice of Allowance (no English translation available) for Thailand Patent Application No. 1902005265, dated Dec. 14, 2023, 1 page.
Notice of Allowance (no English translation available) for Thailand Patent Application No. 1902005266, dated Dec. 14, 2023, 1 page.
Official Action (no English translation available) for Thailand Patent Application No. 1902005267, dated Dec. 15, 2023, 3 pages.
Official Action (no English translation available) for Thailand Patent Application No. 1902005268, dated Dec. 18, 2023, 3 pages.
Official Action (no English translation available) for Thailand Patent Application No. 1902005269, dated Dec. 19, 2023, 3 pages.
Official Action (no English translation available) for Thailand Patent Application No. 1902005270, dated Dec. 19, 2023, 3 pages.
Official Action for Canada Patent Application No. 216736, dated Jan. 2, 2024, 4 pages.
Official Action for U.S. Appl. No. 17/832,241, dated Jan. 29, 2024, 16 pages.
Ex Parte Quayle Action for U.S. Appl. No. 29/863,700, dated Mar. 1, 2024, 8 pages.
Ex Parte Quayle Action for U.S. Appl. No. 29/818,397, dated Feb. 6, 2024, 6 pages.
Official Action for China (with English translation) Patent Application No. 201980087924.0, dated Apr. 14, 2023, 16 pages.
Official Action (no English translation available) for Thailand Patent Application No. 2202002279, received Jun. 11, 2023, 2 pages.
Official Action (no English translation available) for Thailand Patent Application No. 2202002280, received Jun. 11, 2023, 2 pages.
International Preliminary Report on Patentability for International (PCT) Patent Application No. PCT/US2021/057296, dated May 11, 2023, 9 pages.
Decision to Maintain Patent Right for Japan Patent Application No. 2021-081085, dated Sep. 13, 2023, 31 pages.
Notice of Allowance (with English translation) for Vietnam Patent Application No. 1-2019-04632, dated Aug. 31, 2023, 2 pages.
Article 94(3) Communication for Europe Patent Application No. 19897147.5, dated Jun. 9, 2023, 4 pages.
Official action (with English translation) for Vietnam Patent Application No. 1-2021-03329, dated Sep. 19, 2023, 4 pages.
Official Action (no English translation available) for Thailand Patent Application No. 1802005086, dated Oct. 24, 2023, 3 pages.
Official Action (no English translation available) for Thailand Patent Application No. 1802005096, dated Oct. 24, 2023, 3 pages.
Official Action (no English translation available) for Thailand Patent Application No. 1802005097, dated Oct. 24, 2023, 1 page.
Request for Invalidation (no English translation available) for China Patent Application No. 201930288129.0, dated Oct. 27, 2023, 18 pages.

(56) References Cited

OTHER PUBLICATIONS

Official Action (no English translation available) for Thailand Patent Application No. 1902002149, dated Oct. 24, 2023, 3 pages.
Official Action for U.S. Appl. No. 16/703,558, dated Sep. 27, 2023, 22 pages.

\* cited by examiner
† cited by third party

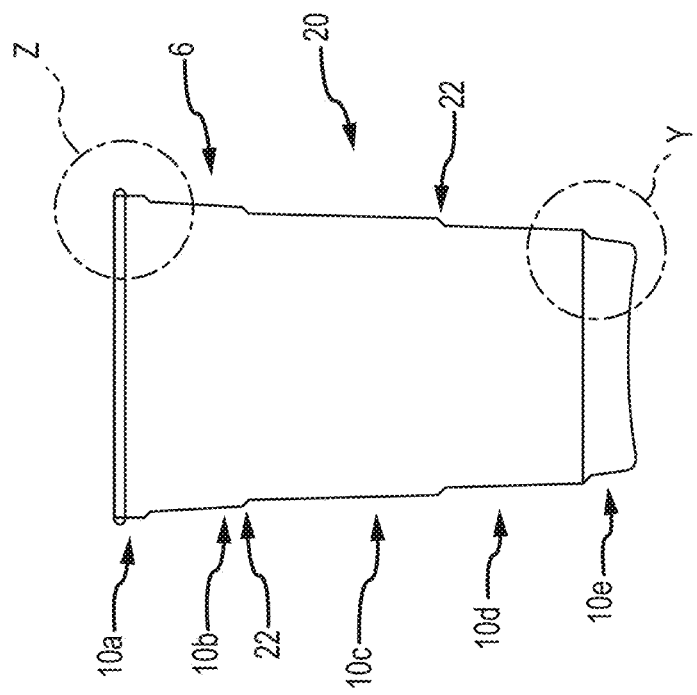
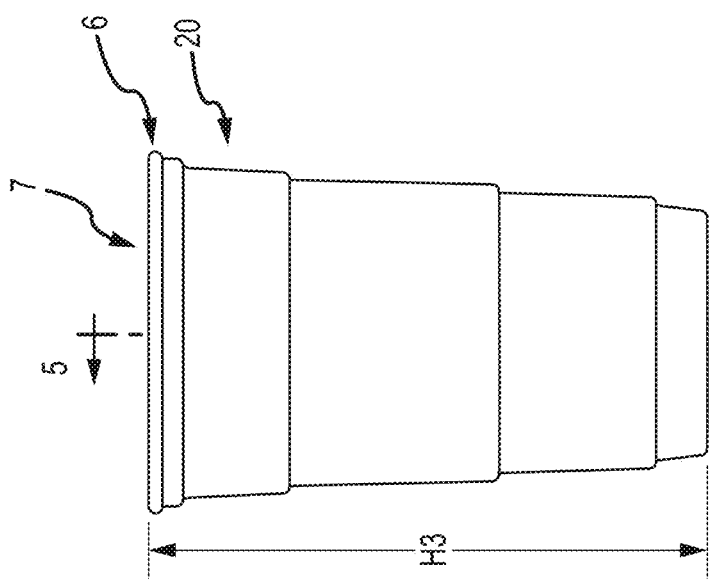

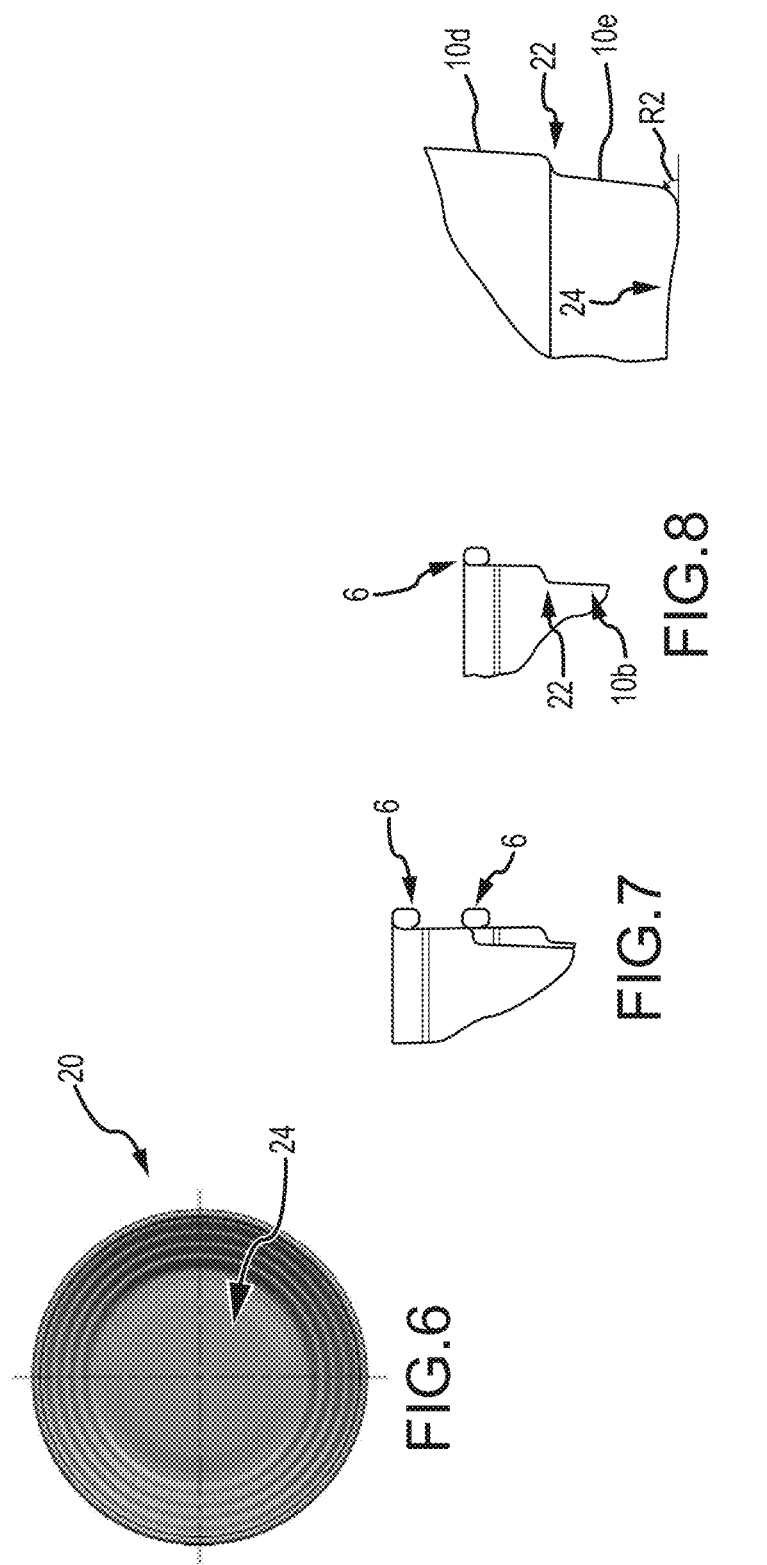

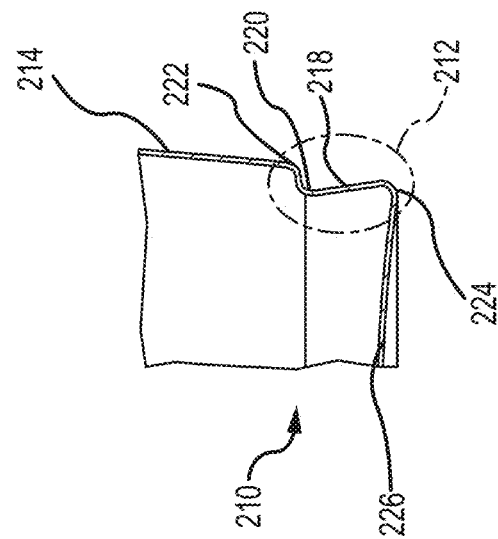
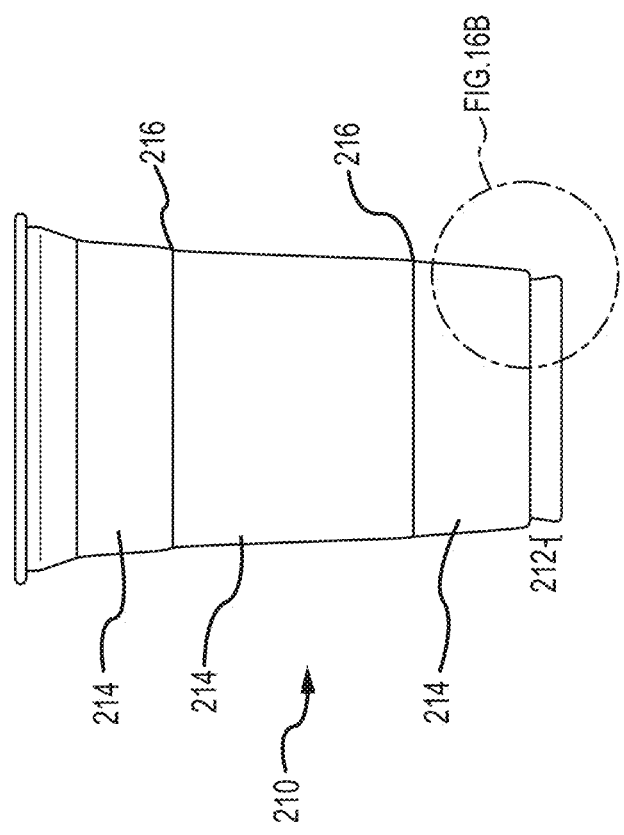

TAPERED CUP AND METHOD OF FORMING
THE SAME

This U.S. Non-Provisional patent application claims the benefit of priority from U.S. Provisional Patent Application Ser. No. 63/108,102 filed Oct. 30, 2020, the entire disclosure of which is hereby incorporated by reference. This application is related to U.S. patent application Ser. No. 16/214,477, which is a Continuation-in-Part of and claims the benefit of priority from U.S. patent application Ser. No. 15/811,032, filed Nov. 13, 2017, and claims the benefit of priority from U.S. Provisional Patent Application Ser. No. 62/455,697, filed Feb. 7, 2017, the entire disclosures of which are hereby incorporated by reference.

FIELD

The present disclosure relates generally to metal cups and methods of forming the same. More specifically, the present disclosure relates to beverage cups formed from a metal. Various embodiments of the present disclosure provide for a thin-walled beverage cup that is stackable with cups of similar construction.

BACKGROUND

Existing disposable beverage cups and drinking containers typically comprise a plastic material. Plastic cups are manufactured from injection molding or thermoforming operations, whereby many lightweight and disposable cups may be formed. Existing metallic beverage containers generally comprise drinking cans including an end closure secured to the upper end of a filled can.

U.S. Pat. No. 4,366,696 to Durgin et al., which is hereby incorporated by reference in its entirety, discloses a nestable can and method of forming the same from a blank. Durgin et al., however, fail to disclose various features of the present disclosure including, for example, a tapered or stepped geometry as shown and described herein and methods of forming the same.

U.S. Pat. No. 4,914,937 to Bulso et al., which is hereby incorporated by reference in its entirety, discloses a method of forming a tapered container. Bulso et al. provide a straight-walled cup and a method of forming the same, but is devoid of various teachings of the present disclosure.

U.S. Pat. No. 6,463,776 to Enoki et al., which is hereby incorporated by reference in its entirety, discloses a manufacturing method for bottle-shaped cans with a neck and shoulder portion. Enoki et al. fail to disclose various features and methods of the present disclosure. For example, Enoki et al. fail to provide a cup-shaped container with tapered, straight sidewalls.

SUMMARY

Accordingly, there has been a long-felt and unmet need to provide a metal cup that is reusable and recyclable. There has also been a need to provide a tapered metal cup that is stackable to enhance shipping and storing of a plurality of cups.

In various embodiments, a tapered metal cup is provided that comprises shallow wall angles. Shallow wall angles, at least as used herein, comprise wall angles that are less than 30 and preferably less than approximately 10 degrees as measured from a vertical center line or vertical axis of the cup. The angular sides and shallow wall angles of cups as shown and described herein allow for stackability of at least two cups, which provides advantages for shipping and storage. In some embodiments, wall angles are provided that are larger than 10 degrees. In some embodiments, wall angles are provided that are between approximately 8 and 20 degrees.

In various embodiments, metal cups are provided comprising thin-walled aluminum. Preferably, metal cups are provided comprising a recycled aluminum alloy. Various embodiments, including those comprising thin-walled aluminum provide cups that are lightweight, are formed of a recycled and/or recyclable material, and are more rigid, useful, and durable than conventional plastic cups, for example.

In preferred embodiments, a metal cup is provided with a constant wall thickness along at least a portion of the cup. An incoming gauge of the cup is reduced to a thinner wall thickness in the sidewalls of the cup. Horizontally-extending steps or ribs preferably extend around an entire circumference of the cup, and are provided to add strength to the finished cup while maintaining a lightweight character of the cup. The steps or ribs are provided as transition points between sections of the finished cup having different diameters. Alternatively, a tapered cup is provided without ribs, where the cup comprises a relatively smooth and linear sidewall which extends from the upper end of the tapered cup to the closed lower end.

In various embodiments, a method of forming a metal cup is provided. In one embodiment, a method of forming a metal cup comprises feeding an aluminum coil into a cupping press and producing a straight-walled cup from a substantially circular blank cut from the aluminum coil. The cup preferably has a constant wall thickness that is approximately equal to the incoming gauge of the aluminum. The cup is then fed into a bodymaker where the metal is redrawn and ironed. The cup is further formed by washing the cup, and decorating and/or coating an outside and an inside of the cup. In certain embodiments, at least a portion of the exterior of the cup is decorated with a color, a logo, or other visual information. Subsequent to washing and coating operations, a top edge of the cup is curled, partially curled, or throttled to eliminate the sharp edge that is formed by the press. The cup is then drawn down in diameter and multiple straight wall sections are formed. Each of the straight wall sections is expanded to a larger diameter using a die with a tapered profile. Finally, a bottom dome is provided in the bottom wall of the cup wherein the dome provides enhanced structural stability to the cup. In various embodiments, a dome is provided in the bottom of a metal cup to provide enhanced strength and stackability features. It should be recognized, however, that the term "dome" is not limited to any particular geometric shape and is contemplated as including, without limitation, conical and frustoconical "dome" members. The present disclosure contemplates that a central bottom portion of the cup is positioned vertically above a standing surface of the cup.

In various embodiments, cups are provided that comprise a non-constant wall thickness. It is contemplated, for example, that the wall thickness may vary throughout the cup and the thickness in a base of the cup may be different than a thickness at other regions of the cup (for example).

In another embodiment, a method is provided wherein a bodymaker step is eliminated in favor of multiple redraw steps after the cupper. In this case the cup maintains a constant wall thickness through the entirety of the container.

In one embodiment, a method of forming a tapered metallic cup is provided, the method comprising the steps of providing a stock metal material; forming at least one cup using a blank and draw operation; performing a redrawing operation on the cup to provide the cup with a predetermined height and a wall thickness; subsequent to the redrawing operation, trimming the cup to a second height; curling the top edge of the trimmed cup to form a lip; forming one or more straight wall sections in the cup by drawing the cup; expanding each of the one or more straight wall sections using one or more dies with a tapered profile; and forming a dome in the bottom of the cup. In various embodiments, each cup section is expanded by not more than 15%, wherein percentage expansion is expressed as [(final diameter−initial diameter)/initial diameter]×100.

In another embodiment, a method of forming a tapered metallic cup is provided, the method comprising the steps of providing a stock metal material; forming at least one cylindrical preform from the stock material; trimming the cylindrical preform to a second height; curling a top edge of the trimmed cylindrical preform to form a lip; forming a cup by providing one or more straight wall sections in the cylindrical preform by drawing the preform; expanding each of the one or more straight wall sections to a larger diameter using one or more dies with a tapered profile; and forming a dome in the bottom of the cup.

In one embodiment, a tapered metallic cup is provided. The tapered metallic cup comprises an upper end and a lower end, and a height extending between the upper end and the lower end. The upper end comprises a curled, partially curled, or throttled lip and an opening. A plurality of tapered sections are provided between the upper end and the lower end, with a step provided between each of the tapered sections. Each of the tapered sections comprises a wall thickness and a tapered profile. Wall thickness may vary within a given panel and/or across different portions of a cup. Adjacent tapered sections of the plurality of tapered sections comprise successively smaller diameters, and the step provided between each of the tapered sections comprises a transition in diameter.

In some embodiments, containers and cups of the present disclosure comprise a shape, geometry, or profile which enables stacking the cups and increases the ease with which stacked cups can be separated. Specifically, in certain embodiments, at least a lower portion of a cup comprises a profile as shown and described herein that reduces or prevents a vacuum, suction force or taper-lock/friction force (result of two tapered panels, or a tapered panel and vertical-walled panel pushing into one another) that otherwise tends to prevent or impede the separation of stacked cups.

Embodiments of the present disclosure provide for methods and systems for forming metallic cups. In some embodiments, methods and associated tooling are provided for forming cups with a feature or shape that reduce at least one of a vacuum force, a suction force, and a friction force that is provided between stacked cups at least when the stacked cups are pulled apart.

In some embodiments, anti-sticking features of the present disclosure provide for a cup geometry and an outer profile of a cup that enables a gap or separation to be provided between the curls of adjacent cups even when the adjacent cups are nested or stacked. This substantially prevents adjacent cups from sticking to one another and reduces the force required to separate adjacent cups. In certain embodiments, adjacent curls of stacked cups are provided with a gap of at least approximately 0.01 inches and 0.5 inches, and more preferably of about 0.20 inches, even when the adjacent cups are fully nested (i.e. one cup is completely inserted into the adjacent cup).

In one embodiment, a tapered metallic cup is provided that comprises an upper end, a lower end, and a height extending between the upper end and the lower end. The upper end comprises a curl, and a plurality of tapered sections are provided between the upper end and the lower end, with a step provided between each of the tapered sections. Each of the tapered sections comprises a wall thickness and a tapered profile. Wall thicknesses of cups of the present disclosure are contemplated as comprising thicknesses between approximately 0.002 inches and 0.010 inches. Adjacent tapered sections of the plurality of tapered sections comprise successively smaller diameters, and the step provided between each of the tapered sections comprises a transition in diameter. The lower end of the cup comprises a domed portion, a first radius, an inwardly tapered sidewall, a second radius and a third radius. The first and third radii comprise convex features, and the second radius is provided between the first and third radii.

In one embodiment, a tapered metallic cup is provided that comprises an upper end and a lower end, and a height extending between the upper end and the lower end. A plurality of tapered sections is provided between the upper end and the lower end. Each of the tapered sections preferably comprises a tapered profile. Adjacent tapered sections of the plurality of tapered sections comprise successively smaller diameters. The lower end of the cup comprises a stacking feature with a plurality of inflection points, the stacking feature comprising a first radius, an inwardly tapered sidewall, a second radius and a third radius. The first and third radii comprise convex features, and the second radius is provided between the first and third radii.

In one embodiment, a method of forming a tapered metallic cup is provided. The method comprises providing a stock material; forming at least one cup using a blank and draw operation; performing a redrawing operation on the cup to form a predetermined height and a wall thickness; subsequent to the redrawing operation, trimming the cup to a second height; curling the top edge of the trimmed cup to form a lip; forming one or more straight wall sections in the cup by drawing the cup; expanding each of the one or more straight wall sections using one or more dies with a tapered profile; forming a dome in a bottom of the cup; and forming an anti-sticking feature in the bottom of the cup by providing a compression force on the bottom of cup radially exterior to the dome such that a lower section of the cup comprises an inward taper or slope.

In one embodiment, a method of forming a tapered metal cup is provided comprising an initial step of feeding a coil into a cupping press and blanking and drawing a portion of material into a cup. Subsequently, the cup is at least one of drawn, ironed, trimmed, washed, dried, decorated, over-varnished, internally coated and bottom sprayed. A curl is then formed at an upper end or lip of the cup. At least one and preferably a plurality of draw stages are then performed wherein the cup is drawn to a larger height, and wherein the container is narrowed in at least one of the draw stages. Subsequent to at least one of the draw stages, at least one expansion step is performed by an expansion die (for example) to expand the width and diameter of the cup to a desired amount. A final step is contemplated as comprising a reverse taper step in which a reverse taper is formed in a bottom of the cup to form an anti-sticking feature that prevents or reduces cups from nesting or sticking when provided in a stacked arrangement. This final step, which is contemplated as being an optional step, renders adjacent stacked cups to be easier to extract or separate.

In various embodiments, methods, systems and devices for cup stacking features are provided to reduce a force required to separate cups from a stacked arrangement. In some embodiment, cups are provided with geometry and features to prevent an extent or amount to which cups "nest" or extend into one another. Such features reduce a force required to separate the cups. In some embodiments, a outward projection is provided that is greater in diameter than a panel or section of a cup upon which the projection is provided. The outward projection provides a resting surface or contact point which prevents a bottom of a cup from contacting or extending down to the bottom panel of an adjacent cup. Outward projections of the present disclosure are contemplated as being provided on any one or more cup panels or segments. In some embodiments, it is contemplated that an outward projection is provided on an uppermost panel or segment. Preferably, the outward projection(s) comprise an annular element that extends completely around a circumference of a cup and comprises a rotationally symmetric feature. In alternative embodiments, however, it is contemplated that the projection(s) extend around less than an entirety of a cup circumference.

It is an object of the present disclosure to provide a stacking or nesting feature that reduces separation force between cups without significantly increasing "stack height" or the total amount of height provided by two stacked cups. The present disclosure contemplates providing a stacking feature or projection on at least one cup panel, and wherein the height of the cup panel that comprises such a feature can be altered to control or determine stack height.

In one embodiment, a tapered metallic cup is provided that comprises an upper end and a lower end, and a height extending therebetween. The upper end comprises a peripheral curl, and a plurality of panels is provided between the upper end and the lower end, with a transition provided between each of the panels. Adjacent panels of the plurality of panels comprise successively smaller diameters, and the transition provided between each of the panels comprises a transition in diameter of the cup. A semiannular projection is provided that extends along at least a portion of a circumference of the cup.

Stacking and anti-sticking features are provided herein. In some embodiments, a reverse-taper feature is provided at a lower end or bottom of a cup. In further embodiments, at least one of an outwardly and inwardly projection is provided that is/are operable to provide a diameter or bulge that is operable to contact an adjacent cup. It is specifically contemplated that one or more of these feature is provided within a single cup. Accordingly, stacking and anti-sticking features are not mutually exclusive. While is contemplated that cups are provided with a single anti-sticking or stacking feature as shown and described herein, it is further contemplated that cups are provided with multiple features that are shown and described herein, even if a specific combination is not shown in the Figures.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
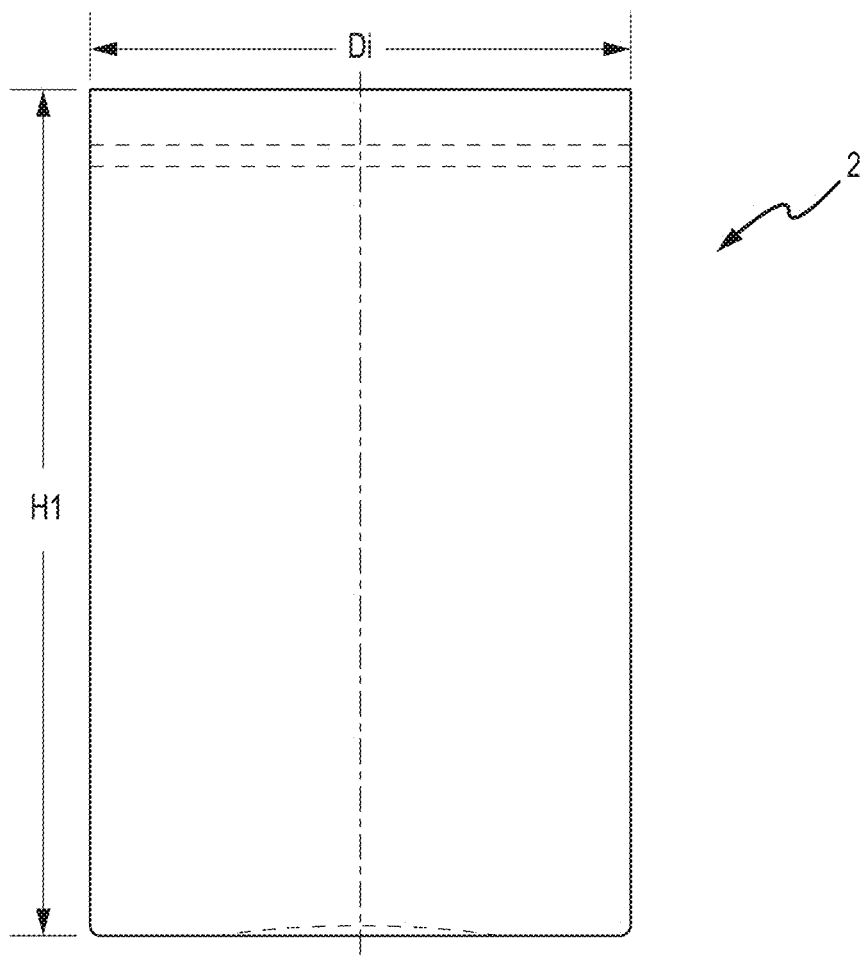

FIG. 1 is a front elevation view of a container body in one stage of formation and according to one embodiment of the present disclosure.

Figure 2:
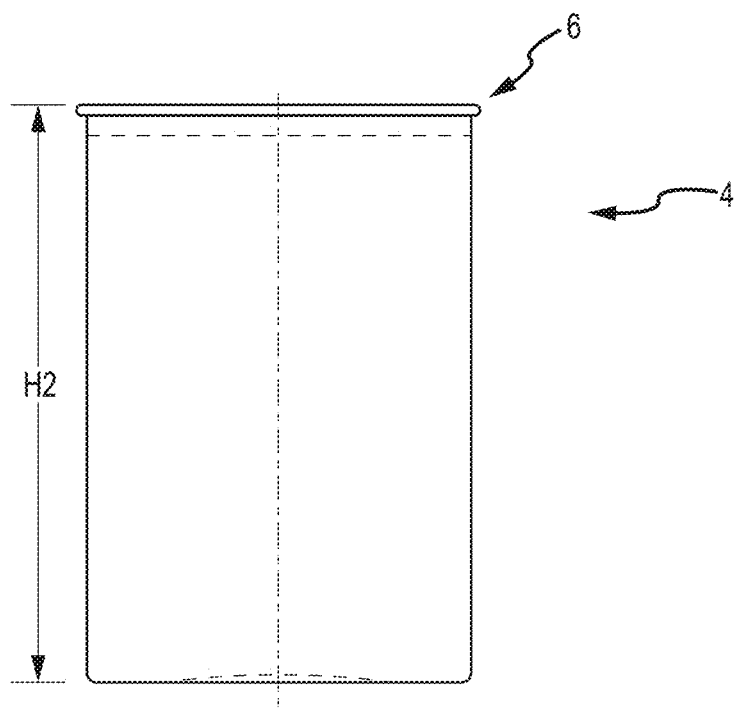

FIG. 2 is a front elevation view of a container body in one stage of formation and according to one embodiment of the present disclosure.

Figure 3:
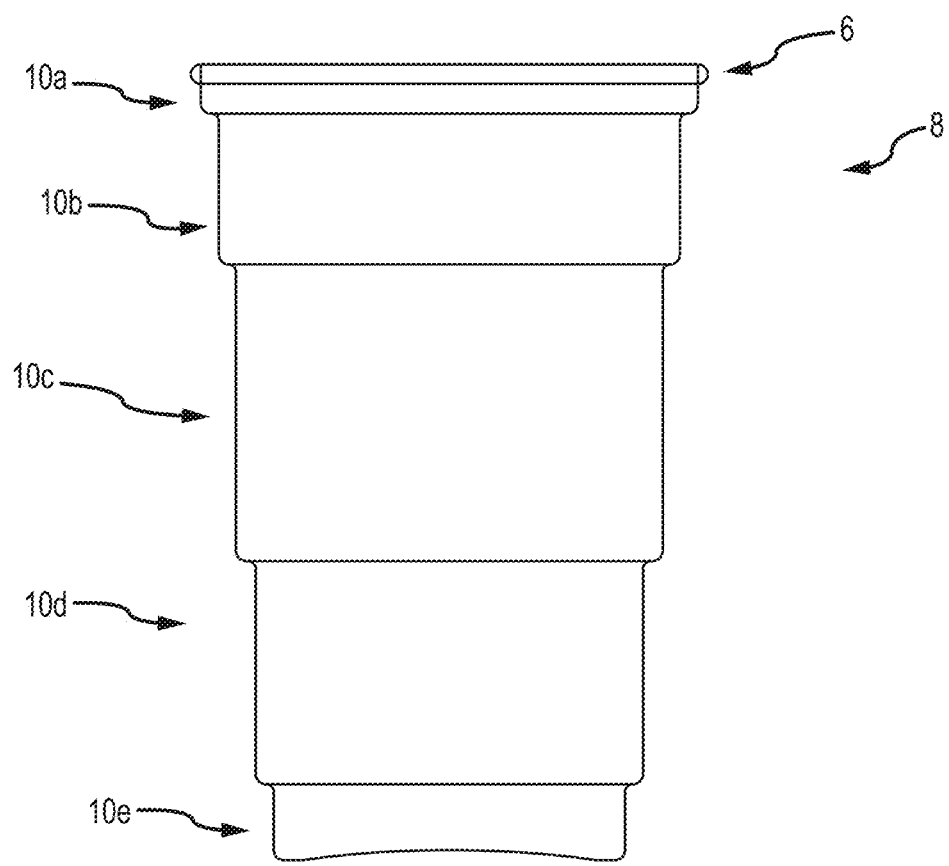

FIG. 3 is a front elevation view of a metal container according to one embodiment of the present disclosure.

FIG. 4 is a front elevation view of a stackable metal container according to one embodiment of the present disclosure.

FIG. 5 is a cross-sectional elevation view of the container according to the embodiment of FIG. 4 and taken at section A-A.

FIG. 6 is a top plan view of the container according to the embodiment of FIG. 4.

FIG. 7 is a detailed elevation view of a portion of multiple containers stacked according to one embodiment of the present disclosure.

FIG. 8 is a detailed elevation view of a portion of a container according to one embodiment of the present disclosure.

FIG. 9 is a detailed elevation view of a portion of a container in accordance with the embodiment of FIG. 4.

Figure 10:
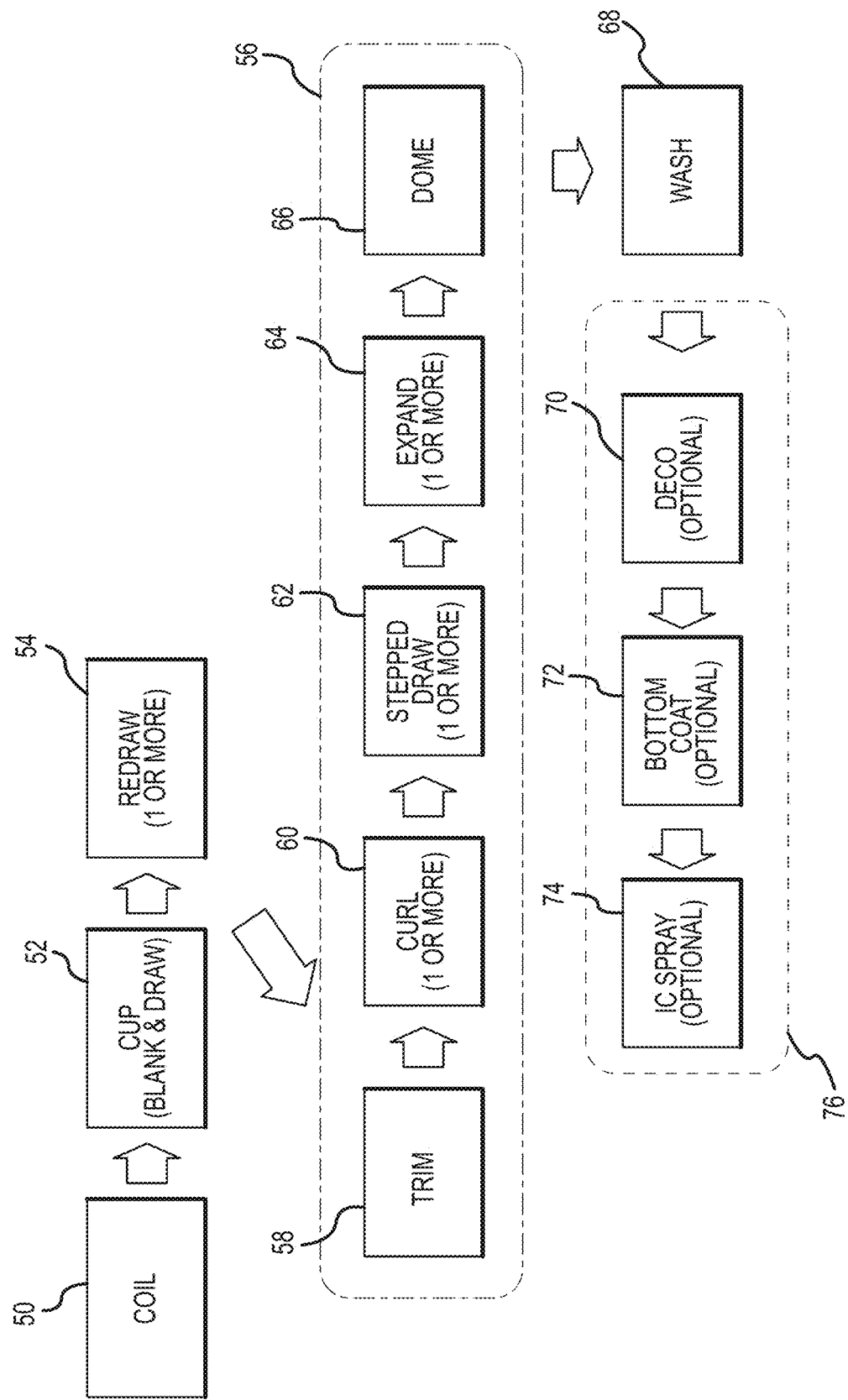

FIG. 10 is a flow chart depicting a method of forming a metal cup according to one embodiment of the present disclosure.

Figure 11:
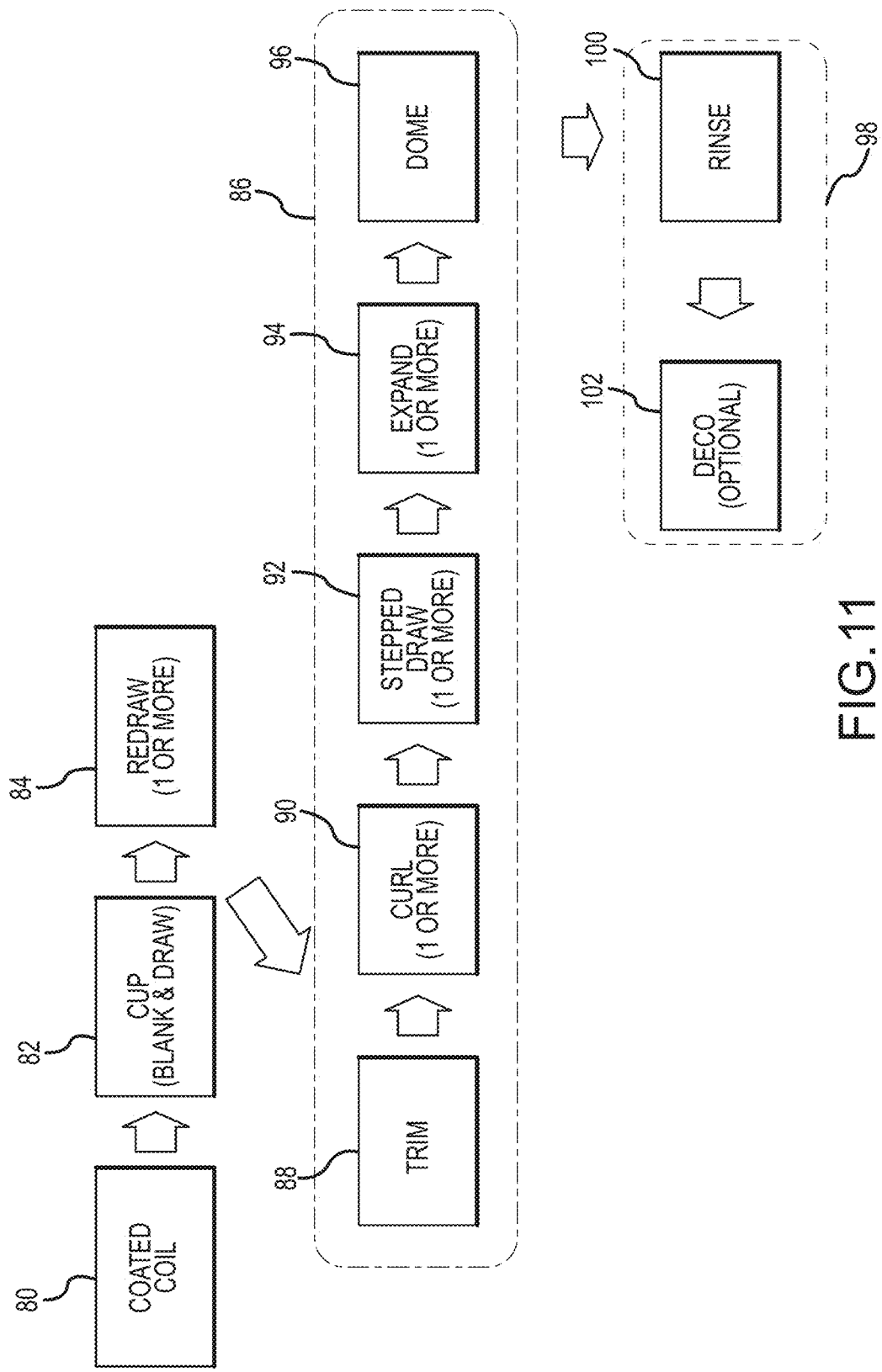

FIG. 11 is a flow chart depicting a method of forming a metal cup according to one embodiment of the present disclosure.

Figure 12:
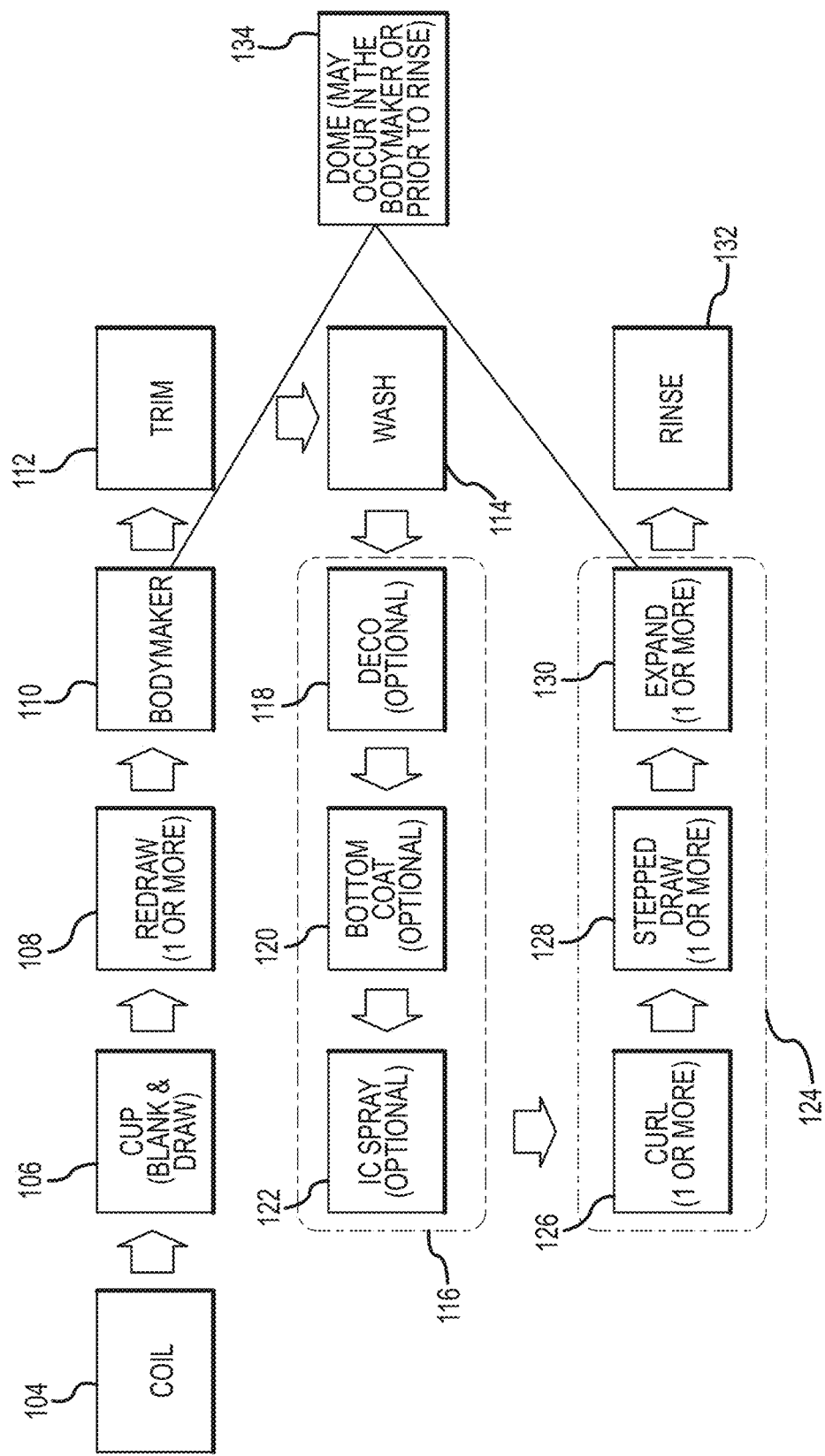

FIG. 12 is a flow chart depicting a method of forming a metal cup according to one embodiment of the present disclosure.

Figure 13:
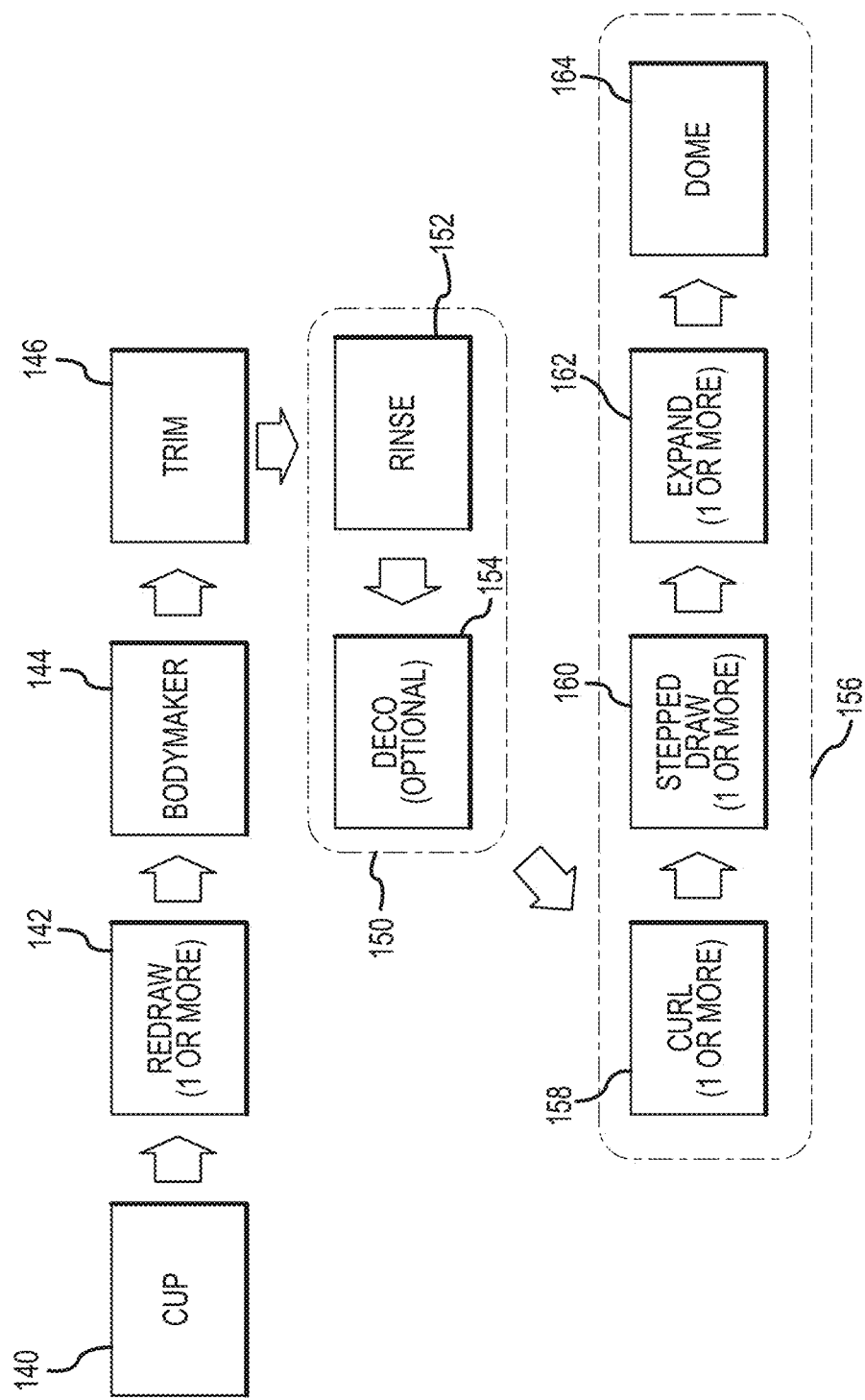

FIG. 13 is a flow chart depicting a method of forming a metal cup according to one embodiment of the present disclosure.

Figure 14:
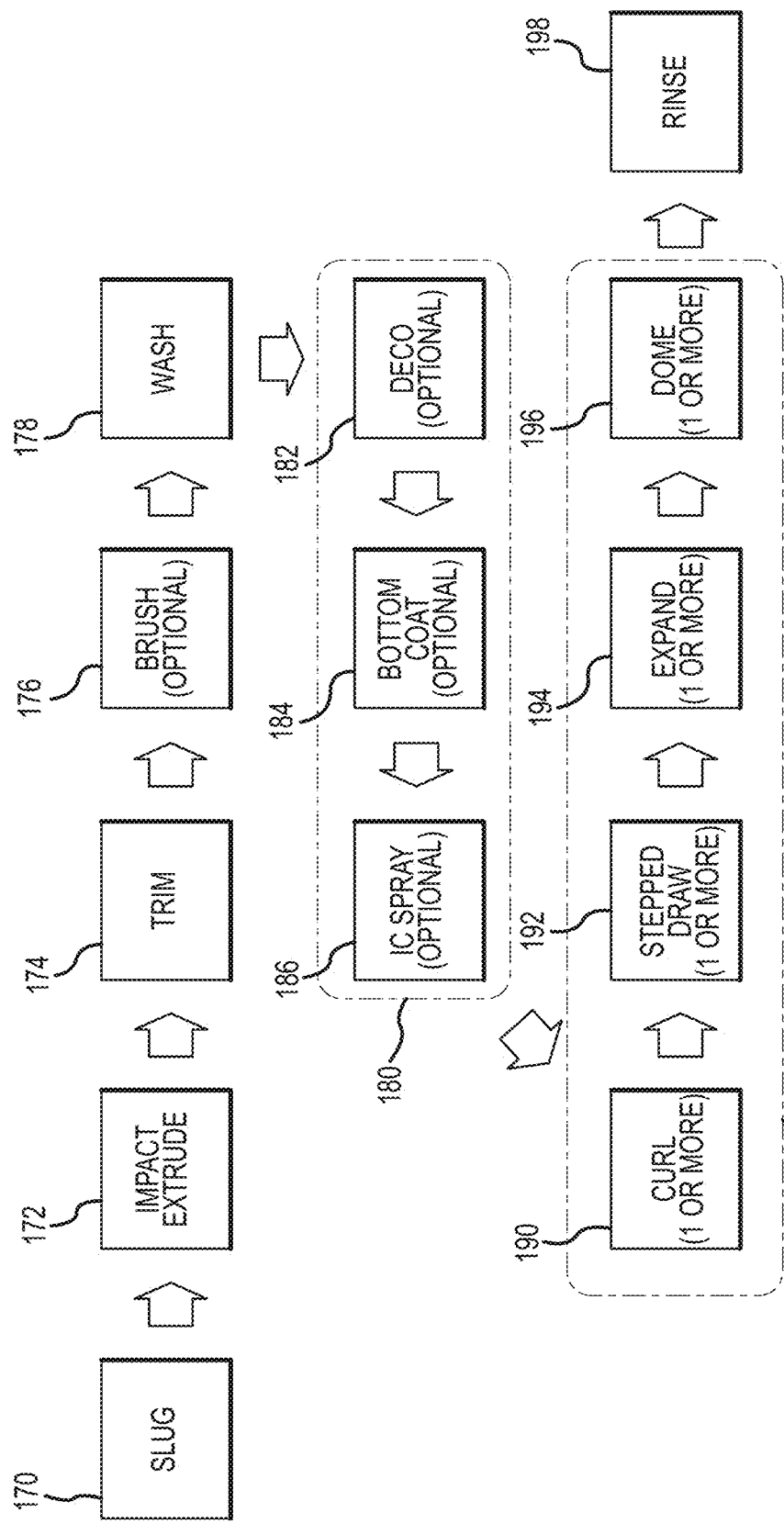

FIG. 14 is a flow chart depicting a method of forming a metal cup according to one embodiment of the present disclosure.

Figure 15B:
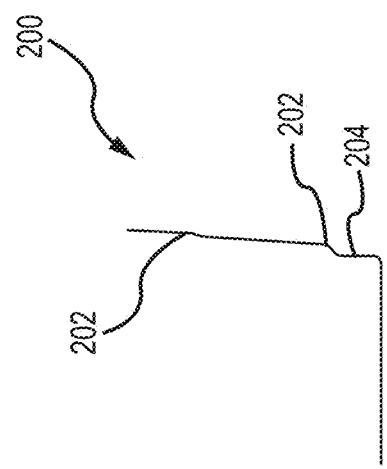
Figure 15A:
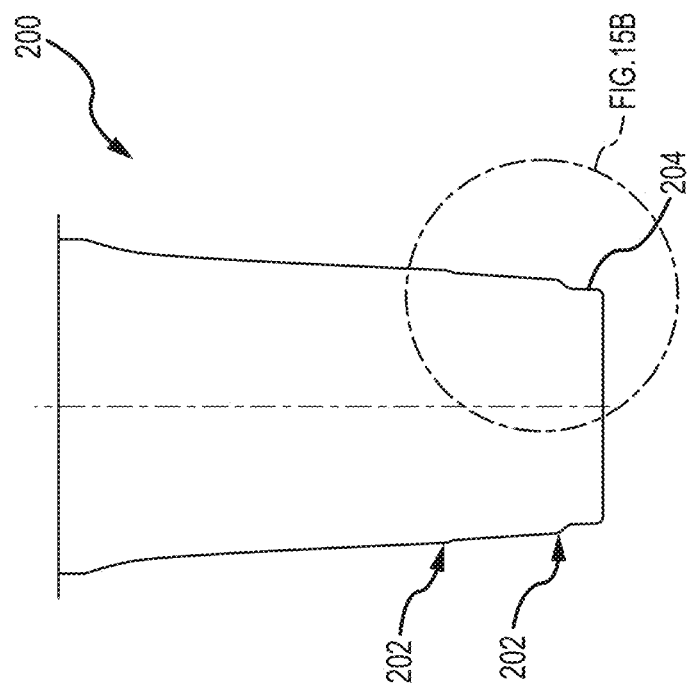

FIG. 15A is a cross-sectional elevation view of a cup according to an embodiment of the present disclosure.

FIG. 15B is a detailed view of the lower portion of the cup of FIG. 15A.

FIG. 16A is a cross-sectional elevation view of a cup according to an alternative embodiment of the present disclosure.

FIG. 16B is a detailed view of the lower portion of the cup of FIG. 16A.

Figure 17:
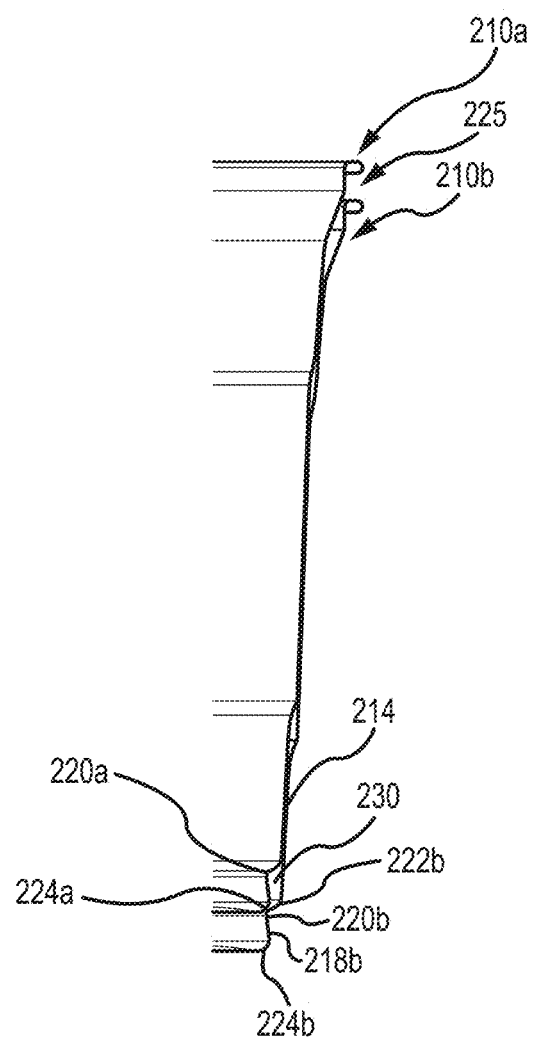

FIG. 17 is a cross-sectional view of a plurality of cups provided in a stacked or nested arrangement.

Figure 18:
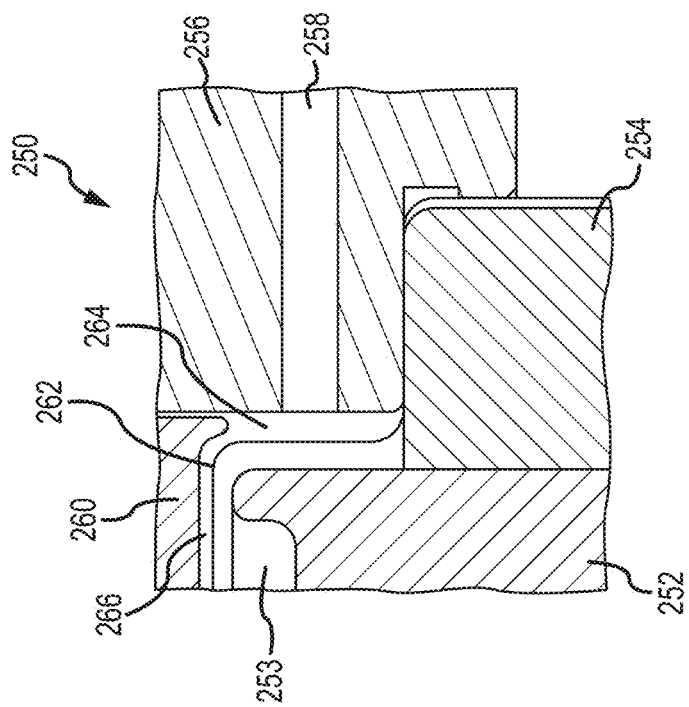

FIG. 18 is a cross-sectional view of tooling components according to one embodiment of the present disclosure.

Figure 19:
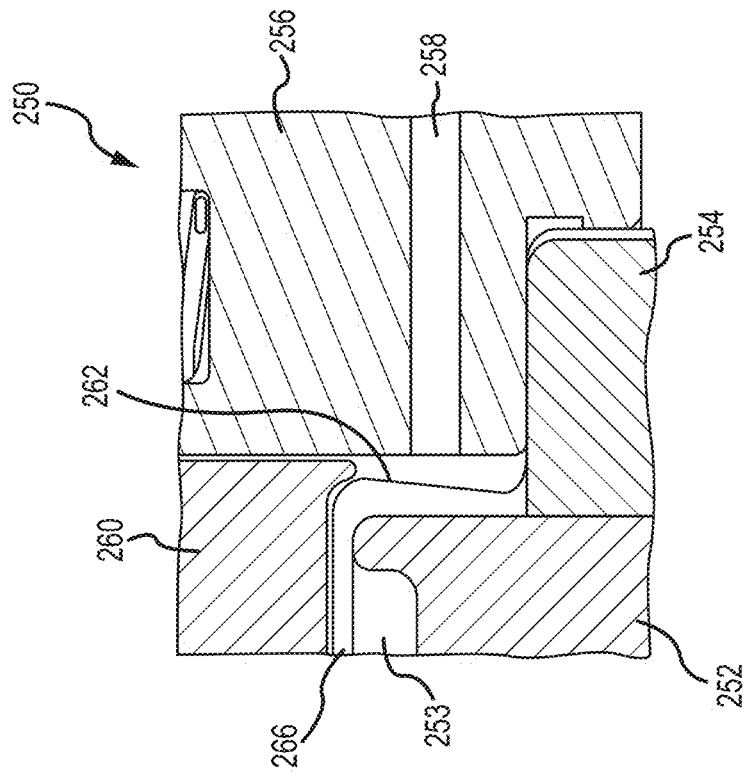

FIG. 19 is a cross-sectional view of the tooling components of the embodiment of FIG. 18.

Figure 20:
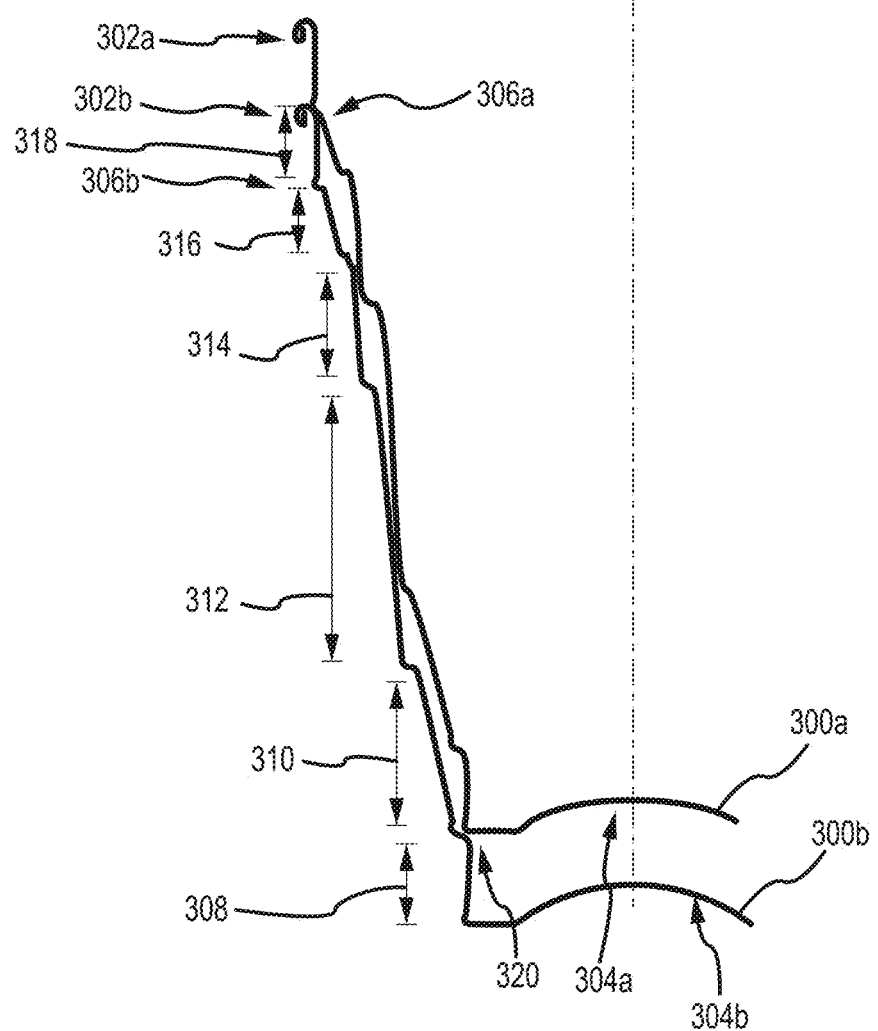

FIG. 20 is a cross-sectional view of cups of the present disclosure according to one embodiment.

Figure 21:
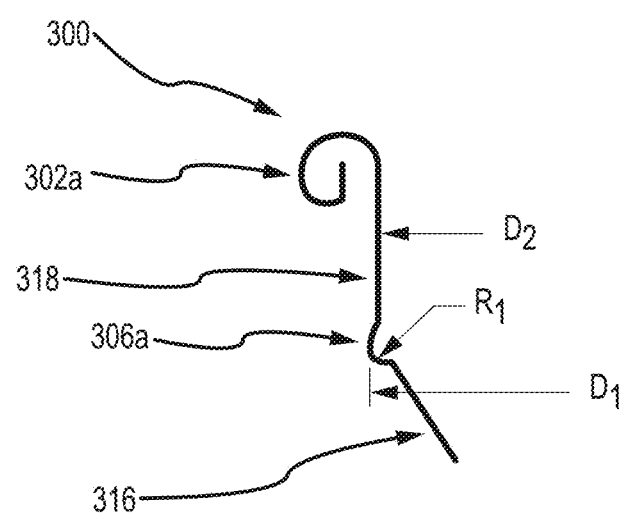

FIG. 21 is a detailed cross-sectional view of a feature of a cup according to one embodiment of the present disclosure.

Figure 22:
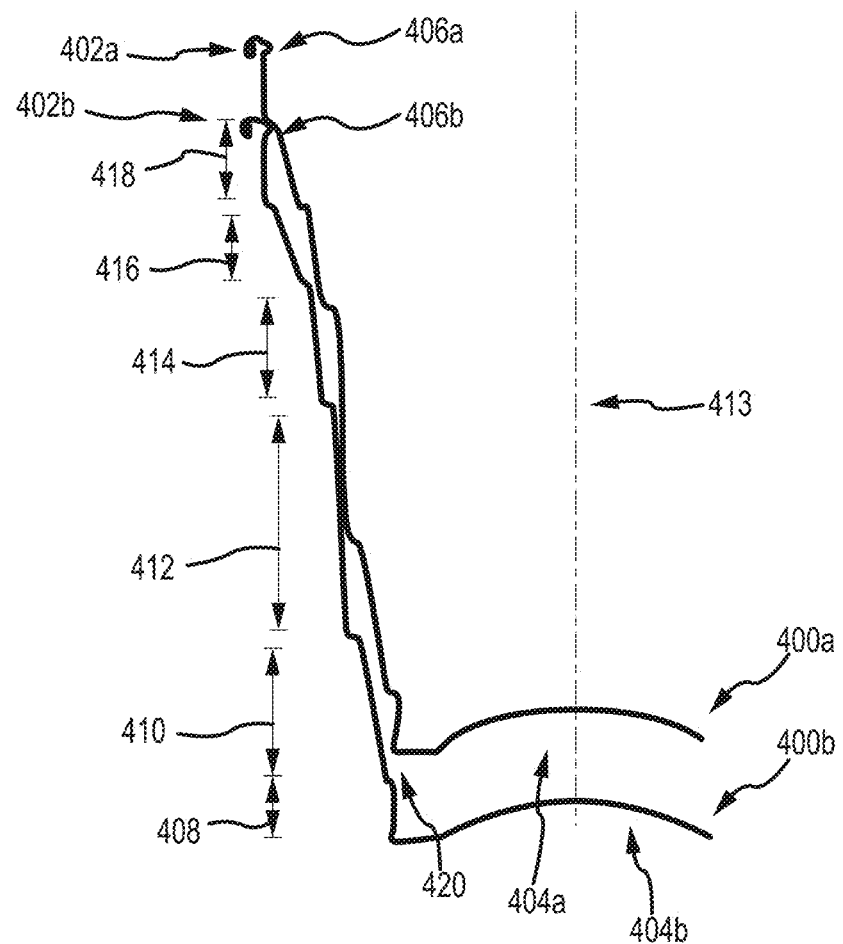

FIG. 22 is a cross-sectional view of cups of the present disclosure according to one embodiment.

Figure 23:
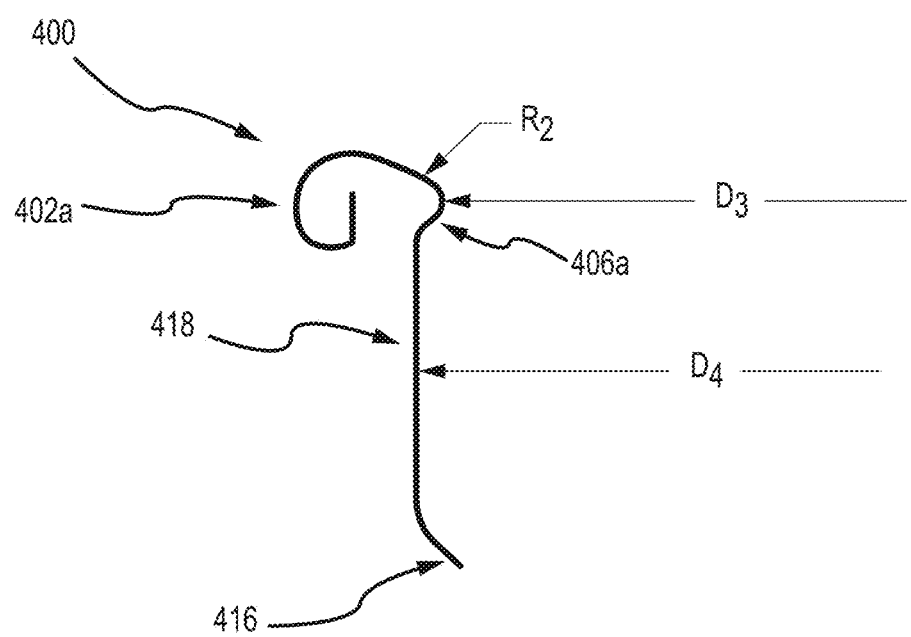

FIG. 23 is a detailed cross-sectional view of a feature of a cup according to one embodiment of the present disclosure.

DETAILED DESCRIPTION

FIG. 1 is a front elevation view of a straight-walled preform 2. The preform 2 represents an initial forming stage of a metal cup according to one embodiment of the present disclosure. The straight-walled preform 2 is preferably formed by feeding a quantity of metal (e.g. aluminum) into a cupping press and forming a preliminary drawn cup from a blank sheet cut from a coil of metal material. The resulting straight-walled drawn cup preferably comprises a wall thickness that is approximately equal to the incoming gauge of the metal fed into the cupping press. For example, in some embodiments, the wall thickness in the bottom of the cup comprises a thickness that is approximately equal to the incoming gauge. The preliminary drawn cup is then fed into a bodymaker wherein the metal is ironed. The resultant straight-walled preform 2 comprises a sidewall where the base comprises a thickness approximately equal to an incoming gauge of metal, and the sidewall in some embodiments comprises a thin-wall portion and a thick-wall portion. In some embodiments, the thin-wall portion is not provided. The straight-walled preform 2 comprises an initial diameter Di that generally corresponds to and is approximately equal to the diameter of the punch that forms the cup. In various embodiments, the initial diameter Di is between approximately 2.0 inches and 6.0 inches. In preferred embodiments, the initial diameter Di is between approximately 3.0 and 4.0 inches, and more preferably is of approximately 3.290 inches.

The straight-walled preform 2 comprises a height H1 of between approximately 3.0 and 10.0 inches. In preferred embodiments, the preform 2 comprises a height H1 of between approximately 3.5 and 5.5 inches, and more preferably of approximately 4.463 inches. A bottom portion of the preform comprises a radius of curvature resulting from the shape and contact of the punch used to form the cup. In various embodiments, this radius R is between approximately 0.025 inches and 0.250 inches, and preferably of approximately 0.059 inches.

FIG. 2 is a front elevation view of a curled preform cup 4 in a further phase of the formation. The curled preform 4 of FIG. 2 comprises the thin-walled preform 2 of FIG. 1, and wherein a curl 6 is provided on the upper edge or lip of the cup. The curl 6 is provided to eliminate a sharp edge, provide added rigidity, and provide a means for removal from draw tooling. As shown in FIG. 2, the curled preform cup 4 comprises a reduced height as compared to the preform 2 of FIG. 1. Specifically, the curled preform cup 4 of FIG. 2 comprises a height H2 of between approximately 3.5 and 5.5 inches, and preferably of approximately 4.233 inches.

Prior to or subsequent to the forming of the curl 6, the preform 4 may be washed, coated, and/or decorated. It is contemplated that at least one of the inside and the outside of the preform is coated with epoxy resin and/or other materials that will be recognized by one of ordinary skill in the art. The cup is coated to protect the aluminum from oxidization and to prevent corrosion of the aluminum from the cup contents. It is further contemplated that an inside and/or outside of the cup is provided with paint or other ornamental treatment.

FIG. 3 is a front elevation view of a straight drawn cup 8 according to one embodiment of the present disclosure and formed from the curled preform cup 4 of FIG. 2. As shown, the straight drawn cup 8 comprises a curl 6 at an upper end or lip of the cup.

The straight drawn cup 8 further comprises a plurality of sections 10a, 10b, 10c, 10d, 10e wherein the sections each comprise straight-wall sections of successively smaller diameter and varying height, as shown in FIG. 3. FIG. 3, as well other Figures of the present disclosure, are provided with dimensions. These dimensions are provided by way of example only and illustrate cups and features according to certain embodiments. It will be expressly recognized that devices, inventions and features of the present disclosure are not limited to the dimensions provided in the drawings, and various modifications and proportions are contemplated. The straight drawn cup 8 of FIG. 3 comprises an intermediate phase of the forming process of a cup of the present disclosure.

As shown in FIG. 3, the straight drawn cup 8 comprises a plurality of sections 10, wherein each of the sections 10 comprise a successively smaller diameter from an upper end to a lower end of the straight drawn cup 8, wherein the uppermost section 10a comprises the largest diameter, and the lowermost section 10e comprises the smallest diameter. The sections comprise varying heights, wherein the relative heights can be characterized as: 10c>10d>10b>10e>10a. As shown in FIG. 3, the straight drawn cup 8 comprises five sections and four ribs. The number of sections and ribs may vary depending on consumer requirements. The section heights may also vary depending on consumer requirements.

FIGS. 4-5 illustrate a finished tapered metallic tapered cup 20 according to one embodiment of the present disclosure. The tapered cup 20 is preferably formed from the straight drawn cup 8 of FIG. 3 by expanding each of the straight walled sections 10 to a larger diameter (as compared to that shown in FIG. 3) using a die (not shown) with a tapered profile.

As further shown in FIG. 4, the finished tapered cup 20 is expanded to a final height H3 that is greater than H2. Specifically, the finished tapered cup 20 comprises a height H3 that is between approximately 4.5 and 6.50 inches, and preferably of approximately 5.330 inches. The final height H3 is produced by an expansion die during a final forming process. An opening 7 is provided at the upper end of the tapered cup 20, wherein the opening is devoid of a closure, a seal, etc. The opening is at least partially defined by the circumference of the curled portion 6, and wherein the curled portion 6 comprises at least a portion of a user-interface wherein a user's mouth is intended to contact the curled portion 6 during drinking.

FIG. 5 is a cross-sectional elevation view of the tapered metallic tapered cup 20 as shown in FIG. 4, and wherein the cross-section is taken at line 5-5 of FIG. 4. As shown in FIG. 5, the tapered cup 20 comprises a tapered profile comprising multiple stepped sections 10a, 10b, 10c, 10d, 10e, wherein each successive section comprises a smaller diameter by way of a step 22. Additionally, each section comprises an angled or tapered sidewall formed by a tapered expansion die.

Various internal diameters of a plurality of sections 10 are provided. In some embodiments, a finished tapered cup 20 comprises a plurality of sections 10 comprising relative diameters characterized as: 10a>10b>10c>10d>10e. Specific diameters are provided and illustrated as being measured from an upper portion of each respective section 10. The plurality of sections 10 comprise varying heights, wherein the relative heights can be characterized as: 10c>10d>10b>10e>10a. An internal diameter of a curled section 6, which also comprises a drinking interface, comprises a diameter of between approximately 2.0 and 5.0 inches, and preferably of approximately 3.290 inches. Details Y and Z are indicated on FIG. 5, and are shown in detail in FIGS. 9 and 8, respectively. Various expansion angles are illustrated in FIG. 5, wherein each section 10 expands outwardly along a height of the section 10. As shown, each section 10 comprises a different expansion angle (expressed as a percentage of the diameter over the height of the section). In alternative embodiments, however, it is contemplated that each section 10 comprises the same expansion angle. In the depicted embodiment, the relative expansion angles can be expressed as: 10e>10b>10d>10c. The uppermost section 10a provided in FIG. 5 comprises a straight-walled section that is devoid of an expansion angle.

The straight wall sections of FIG. 5 are contemplated as being formed by drawing the cup and providing an expansion or increased diameter to each of the sections. In some embodiments, it is contemplated that each of the sections is formed using a draw and, subsequent to the initial formation of each of the drawn sections, one or more expansion dies are provided to expand each of the sections. In other embodiments, it is contemplated that the drawing and expanding of the straight wall sections are performed in an alternating manner wherein a first section is drawn and then expanded, a second section is then drawn and expanded, etc. It is also contemplated that the number of draw and expansion operations need not be equal. For example, multiple expansion steps may be provided on a portion formed from a single draw operation. Additionally, a section may be drawn and not provided with a corresponding expansion operation.

FIG. 6 is a top plan view of a finished tapered cup 20 according to the embodiment of FIG. 4. Multiple stepped sections 10 are shown in plan view, and a bottom of the tapered cup 20 comprises a dome 24 in some embodiments.

FIG. 7 is a detailed view of two finished tapered cups 20 provided in a stacked arrangement, and wherein respective curled portions 6 of each tapered cup 20 are provided with a separation or stand-off height. A stand-off height is provided that comprises a height or distance between successive upper ends of the curled portions 6. In the depicted embodiment, the stand-off height is between approximately 0.00 inches and approximately 1.0 inches. Preferably, the stand-off height is approximately 0.28 inches. The stand-off height provides a user with the ability to grasp and separate stacked cups, for example. Although various embodiments contemplate a stand-off height, such a stand-off feature is not required and alternative embodiments contemplate that such a stand-off is not provided.

FIG. 8 is a detailed cross-sectional elevation view of a finished tapered cup 20 showing the upper portion of the cup including the curl 6. FIG. 8 is a detailed view of detail Z of FIG. 5. As shown in FIG. 8, a curled portion 6 of the cup comprises a radius of curvature of between approximately 0.010 inches and 0.250 inches. In the depicted embodiment, a preferred radius of curvature comprises a curvature of approximately 0.040 inches. FIG. 8 also provides a step 22 between adjacent sections 10a, 10b of a tapered cup 20. As shown, the step comprises a first radius of curvature of approximately 0.040 inches and a second radius of approximately 0.040 inches, wherein the two radii of curvature each comprise a transition or departure from an adjacent sidewall of the sections 10a, 10b. Although only one step 22 is depicted in FIG. 8, it is contemplated that each step 22 of the tapered cup 20 is provided comprising the same dimensions as the step 22 shown in FIG. 8. The step 22 can be of any dimension or combination of one or more radii.

FIG. 9 is a detailed cross-sectional elevation view of a finished tapered cup 20 showing the bottom portion of the tapered cup 20 comprising a dome 24. FIG. 9 is a detailed view of detail Y of FIG. 5. FIG. 9 includes various dimensions and details of a tapered cup 20 according to one embodiment of the present disclosure. As shown, the tapered cup 20 comprises a dome 24 in a lower portion of the preform 20. A bottom portion 10e of the cup comprises an outer diameter of between approximately 1.50 and 3.50 inches, and preferably of about 2.349 inches. A radius of curvature R2 is provided as a transition between the bottom section 10e and the dome, wherein the radius of curvature R2 comprises a radius of between approximately 0.010 inches and approximately 0.250 inches. Preferably, the radius of curvature is approximately 0.10 inches. A flat standing surface 30 is provided between the radius R2 and the dome 24, wherein the flat surface 30 comprises a resting or supporting for the finished preform 20. The flat surface 30 generally comprises an annular surface with a width of between approximately 0.0010 inches and 0.125 inches, and preferably of approximately 0.084 inches. In some embodiments, it is contemplated that a flat surface extends around only a portion of a diameter or circumference of a cup. The flat surface 30 extends into a domed section 24 comprising multiple radii of curvature. A central portion of the domed feature 24 comprises a radius of approximately 15.0 inches, and the domed portion 24 transitions to a flat surface 30 as shown. The domed portion 24 and the dimensions thereof may vary in dimensions. In further embodiments, a flat standing surface is not provided.

As shown in FIG. 9, a bottom section 10e of the cup comprises a gauge or wall thickness of approximately 0.0090 inches, and an adjacent section 10d, comprises a gauge or wall thickness of approximately 0.0040 inches. The bottom section 10e comprises a section of enhances gauge and therefore comprises enhanced durability as the bottom section 10e is intended to contact another surface, such as when the cup is placed on a surface, dropped, etc. In certain embodiments, the cup comprises a single metal thickness.

FIG. 10 is a flow chart depicting a method of forming a metal cup according to one embodiment of the present disclosure. As shown, the method of FIG. 10 comprises a first step 50 of providing a coil of metal material from which a cup is to be formed. Preferably, the coil provided in step 50 comprises a coil of aluminum stock material. A second step 52 is provided wherein at least one cup is formed from a blank cut from the coil. The cup is preferably formed using a blank and draw operation. Subsequently, a redraw step 54 is provided wherein the cup is subjected to at least one redraw operation. Method steps 50, 52 and 54 provide an initial cup that is ready for further processing according to methods of the methods of the present disclosure.

The cup provided from the redraw step 54 is further subjected to forming and finishing steps as shown and described herein. In the depicted embodiment of FIG. 10, the cup is subjected to a trimming operation wherein an upper, open end of the cup is cut or trimmed to remove material at step 58. Subsequently, at step 60, the upper trimmed end of the cup is provided with at least one curl (see 6 of FIG. 2, for example). Subsequently, and referring now to step 62, at least one stepped draw operation is performed wherein multiple straight-wall sections are formed in the cup (see FIG. 3, for example). The cup is then expanded via at least one expansion operation in step 64. In some embodiments, the expansion step 64 comprises expanding each of the straight wall sections to a larger diameter using one or more dies with a tapered profile. A doming operation 66 is then performed to provide a dome in a bottom portion of the cup. The dome is probably provided to enhance the structural integrity and stability of the cup. The series of steps described herein and referenced as sequence 56 comprise steps that are contemplated as being re-ordered or eliminated depending on design, customer requirement, and/or machine technology. While at least one embodiment contemplates performing the steps as illustrated in FIG. 10, it is also contemplated that one or more of the steps indicated by 56 may be eliminated or re-sequenced.

Subsequent to the sequence illustrated as 56 in FIG. 10, the cup is then subjected to a washing step 68. After washing, the cup is decorated at step 70, provided with a bottom coat at step 72, and/or an internal coating ("IC") spray step 74. The plurality of method steps indicated by 76 in FIG. 10 are contemplated as being re-ordered or eliminated depending on design, customer requirement, and/or machine technology. For example, depending on customer needs and requirement, the method may terminate after a decoration step 70.

FIG. 11 is a flow chart depicting a method of forming a metal cup according to another embodiment of the present disclosure. As shown, an initial step 80 is provided wherein a coated coil is provided in the form of stock material. Preferably, the coil in step 80 comprises coated aluminum. However, various embodiments of the present disclosure provide and contemplate a "coated" coil that comprises an epoxy, film, polymer or other "paint" cured, laminated or extruded to a surface of the metal using various methods. At least one cup is formed from the coil at step 82, the cup being formed from a blank sheet of material cut from the coil and a draw die. The initial cup formed in step 82 is then subjected to at least one redraw operation in step 84. Having formed an initial cup, the process advances to step 88 where an upper, open portion of the cup is trimmed in step 88, subsequently provided with a curl at step 90, subjected to a stepped redraw operation at step 92 to form at least one straight-walled portion, expanded in diameter at step 94, and provided with a bottom dome through a doming operation at step 96. Steps 88-96 of FIG. 11 are collectively referred to as sequence 86. The steps of this sequence 86 are contemplated as being re-ordered or eliminated depending on design, customer requirements, and/or machinery.

Subsequent to the method steps of the depicted sequence 86, the cup is then subjected to a rinsing or washing operation 100 and a decorating step 102. In FIG. 11, washing and decorating are depicted as a final sequence 98 in which the cup is finished. It is also contemplated, however, that the sequence 98 can be provided subsequent to the redraw step 84 and prior to sequence 86.

FIG. 12 is a flow chart depicting a method of forming a metal cup according to another embodiment of the present disclosure. As shown in FIG. 12, a plurality of initial cup forming steps are provided wherein a coil 104 is provided. At least one cup is formed from the coil material at step 106, preferably by a blank and draw operation. A redraw step 108 is provided in some embodiments to further form the cup. A bodymaker at step 110 is optionally used to form the final cup height.

An upper portion of the cup is then trimmed at step 112. The trimmed cup is then preferably subjected to a washing operation 114. A decorating and/or coating sequence 116 is provided subsequent to washing, the decorating sequence comprising the steps of decorating the cup at step 118, providing a bottom coat 120, and/or providing an internal coating to the cup at step 122. One or more of the steps of the coating sequence 116 may be reordered, eliminated, and/or moved after a rinsing step 132.

Preferably subsequent to the coating sequence 116, final forming steps 124 are provided. The final forming steps preferably comprise at least one of providing a curl to the trimmed portion of the cup at step 126, performing at least one stepped draw operation 128 to form one or more straight walled section in the cup, and performing an expansion step 130 to expand the diameter of the straight walled section(s). The final forming steps 124 are contemplated as being reordered or eliminated depending on user requirements. A rinsing step 132 is provided as a finishing step. However, as previously noted, one or more steps of the coating sequence 116 may be re-ordered such that they occur subsequent to the rinsing step 132. The embodiment of FIG. 12 contemplates providing a dome in a bottom portion of the cup. A doming operation 134 is provided and is contemplated as occurring during the bodymaker operation 110 or prior to rinsing as a final, separate operation.

FIG. 13 is a flow chart depicting a method of forming a metal cup according to another embodiment of the present disclosure. As shown in FIG. 13, a cup is provided at step 140 and is preferably formed from a coil of blank aluminum. The cup is then redrawn at step 142, wherein the cup is subjected to one or more redraw operations. The cup is then fed to a bodymaker at step 144 to form a final cup height and diameter. Subsequently, the cup is trimmed at step 146 wherein an excess cup height created from the redrawing and/or bodymaker operation is trimmed. A cleaning and decorating sequence 150 is provided wherein the cup is subjected to at least one of a rinsing step at 152 and a decorating step 154. The steps of the cleaning and decorating sequence 150 may be moved after the expansion 162 or doming step 164 provided in FIG. 13. One of ordinary skill in the art will recognize that various cleaning and decorating steps may be conducted at different points in the manufacturing process. The present disclosure provides certain method steps and orders of operations for illustrative purposes, and various alternatives are contemplated.

The cup is then advanced to finishing sequence 156, wherein the finishing sequence comprises providing a curl to the trimmed portion of the cup at step 158, providing a stepped redraw operation 160, providing an expansion operation 162 and providing a dome in a bottom portion of the cup at step 164. although the doming step 164 is contemplated as occurring a final step in the embodiment of FIG. 13, it is also contemplated that the doming step may occur within the bodymaker at step 144, making the expansion operation 162 the final step of the embodiment of FIG. 13. The steps of the finishing sequence 156 of FIG. 13 may be re-ordered or eliminated depending on design, customer requirement, and/or machine technology.

FIG. 14 is a flow chart depicting a method of forming a metal cup according to another embodiment of the present disclosure. As shown in FIG. 14, a cup is provided from a slug of blank material. As shown, an initial step 170 comprising providing a slug of material (e.g. aluminum). The slug is impact extruded at step 172 to form a cup. An upper end of the cup is trimmed to a preferred height at step 174 and subsequently brushed and washed at step 176 and 178, respectively. In some embodiments, a step of ironing the impact-extruded cup is provided after impact extrusion (step 172) and prior to trimming (step 174). A washed cup 178 is then provided and subjected to a coating and decorating sequence 180 as shown. The coating and decorating sequence 180 of FIG. 14 comprises the steps of decorating the cup 182, providing a bottom coat to the cup 184 and providing an internal coating (e.g. sprayed coating) to the cup 186. The steps of the coating and decorating sequence 180 may be reordered and/or may be provided subsequent to the rinsing step 198.

After the coating and decorating sequence 180, the method of FIG. 14 proceeds to a finishing sequence 188 that comprises the steps of curling an upper, trimmed portion of the cup at step 190, performing a stepped draw operation 192, providing an expansion operation using one or more expansion dies 194 and forming a dome 196 in a bottom portion of the cup. The steps of the finishing sequence may be re-ordered or eliminated depending on user preference, design, customer requirements, and/or available machine technology. Subsequent to the finishing sequence 188, the cup is washed and/or rinsed at step 198.

FIGS. 15A-15B depict a cup according to one embodiment of the present disclosure. As shown, the cup 200 comprises a rotationally-symmetrical profile with a plurality of steps or ribs 202. In the embodiment of FIGS. 15A-15B, the cup 200 does not comprise an anti-sticking feature according to other embodiments of the present disclosure. Accordingly, a plurality of cups of the embodiment of FIGS. 15A-15B are capable of being stacked or nested in a compact manner. However, this compact manner including a close contact and nesting between an exterior of a sidewall 204 of the bottom portion of one cup and an interior of a sidewall 204 of a second, adjacent cup can cause adjacent cups to be difficult to separate due to a friction force and/or vacuum force between the two cups. FIG. 15B is a detailed view of the lower portion of the cup of the embodiment of FIG. 15A.

FIGS. 16A-16B depict a container 210 according to one embodiment of the present disclosure that comprises a bottom portion 212 having a specific shape and structure to render the separation of stacked, adjacent cups easier for a user. FIG. 16A is an elevation view of the container 210, which comprises a plurality of tapered sections 214 separated by steps or ribs 216. The bottom portion 212 comprises an angled or tapered portion and a base.

FIG. 16B is a cross-sectional elevation view of the container 210 of FIG. 16A. More specifically, the bottom section 212 of the container 210 is enlarged for clarity. As shown, the bottom section 212 comprises a domed portion 226 surrounded by a first radius 224. An inwardly-tapered sidewall 218 extends upwardly to a second radius 220, with a third radius 222 connecting the second radius 220 and a tapered section 214. In some embodiments, a straight-walled section is provided between the second and third radii. As shown in FIG. 16B, the first and third radii 224, 222 comprise convex bends, and the second radius 220 comprises a concave bend. Additionally, the inwardly-tapered sidewall 218 comprises a slope or angle that extends inwardly (i.e. toward a central longitudinal axis of the container from bottom to top), as opposed to the tapered sections 214 that comprise an outward slope or angle. Although a straight walled section 218 is shown in FIG. 16B, other embodiments of the present disclosure contemplate that the first radius 224 extends directly into the second radius 220. Various embodiments of the present disclosure contemplate that the second radius 220 is provided closer to a centerline of the cup than the first radius 224 to provide the stand-off feature shown and described herein. The cup comprises multiple inflection points, wherein the dome transitions to a first radius 224, the sidewall 218 transitions to the second radius 220, and the second radius transitions to the third radius 222.

In various embodiments, the first radius 224 comprises a radius of between approximately 0.050 inches and 0.20 inches, and preferably of about 0.100 inches. In various embodiments, the second radius 220 comprises a radius of between approximately 0.050 inches and 0.20 inches, and preferably of about 0.100 inches. In various embodiments, the third radius 222 comprises a radius of between approximately 0.030 inches and 0.20 inches, and preferably of about 0.060 inches.

In various embodiments, including but not limited to the embodiment shown in FIGS. 16A-16B, a convex curvature of the third radius 222 comprises a radius of curvature of between approximately 0.020 inches and 0.060 inches and preferably of about 0.050 inches. A concave curvature of the second radius 220 comprises a radius of curvature of between approximately 0.050 inches and 1.00 inches and preferably of about 0.080 inches. A substantially horizontally-oriented straight walled section is provided between the second radius 220 and the third radius 222.

FIG. 17 is a cross-sectional elevation view of a plurality of containers 210a, 210b provided in a stacked arrangement. As shown, the containers 210a, 210b are of similar construction and size and each comprise an anti-sticking feature as shown and described herein (see FIGS. 16A-16B, for example). The first radius 224a of a first cup 210a is provided on the interior of the second radius 220b of the second cup 210b. The third radius 222b of the second cup 210b extends outwardly away from the first cup 210a and a void space 230 is created between the two cups 210a, 210b. The void space 230 is provided between the inwardly-tapered portion 218 of the first cup 210a and the outwardly tapered portion 214 of the second cup 210b. Additionally, the structure of the lower portions of the cups 210a, 210b provides for a spacing or stand-off height 225 at the upper ends of the cups wherein the respective curls provided at the upper ends of each of the cups are spaced apart. This allows for a user to grasp and easily separate nested or stacked cups.

FIGS. 18-19 are cross-sectional elevation views of forming tools in accordance with one embodiment of the present disclosure. As shown, a tool pack 250 is provided that comprises a die center punch 252 with a void 253 for receiving a domed bottom portion of a cup. The tooling 250 also comprises a redraw pressure pad 254, a redraw die 256, and a reforming tool 260. A metal cup 262 is shown relative to the forming tools. The redraw die 256 comprises a venting feature 258 to allow air to escape the tool during a forming operation.

FIG. 18 shows the tooling 250 in an initial or starting position of an operation for forming an anti-sticking feature of a cup. As shown in FIG. 18, the cup 262 comprises a tiered or stepped profile, but has not yet been provided with an anti-sticking feature of the present disclosure. The pressure pad 254 and redraw die 256 have been brought into contact and the cup 262 is compressed between the two components. An internal gap 264 is provided to allow for the bottom portion of the cup 262 to move outwardly.

FIG. 19 shows the forming tools 250 and the cup 262 in a forming position. As shown in FIG. 19, the bottom portion of the cup 262 has been provided with an anti-sticking feature. During formation, the reforming tool 260 is moved downwardly (at least as shown in FIG. 19) to contact the bottom portion of the cup 262. A concave void 266 provided in the reforming tool 260 that contacts the bottom portion of the cup 262 exterior to a domed area of the cup 262 and expands the bottom portion. The result is that the cup takes on a shape as shown in FIG. 19 wherein a lowermost portion of the cup 262 is expanded outwardly relative to the remainder of the bottom portion and the cup 262 is provided with an inward taper as is further shown and described in FIG. 16B, for example. The metal of the cup moves outwardly at a bottom portion (corresponding to the first radius 224 of FIG. 16B), and inwardly proximal to the second radius (220 in FIG. 16B). During this movement, dome home is preferred kept constant.

FIG. 20 is a cross-sectional elevation view of cups 300a, 300b provided in a stacked or stacking arrangement. As shown, first and second cups 300a, 300b each comprise an upper portion with a peripheral curl 302a, 302b and lower portion having an upstanding dome portion 304a, 304b. A cup height extends between the upper portion and lower portion of each cup, and a plurality of cup sections or panels 308, 310, 312, 314, 316, 318 are provided along the height. The panels are shown and labeled with respect to the second cup 300b for purposes of clarity. It will be recognized, however, that the two cups of FIG. 20 comprise substantially the same layout and geometry. The cup shape including number of panels and size of panels may vary. In preferred embodiments, each cup comprises a plurality of panels wherein the panels sequentially decrease in diameter from top-to-bottom to form the tapered profile shown in FIG. 20, for example. As shown in FIG. 20, it is an object of the present disclosure to provide an offset and/or prevent contact between bottom portions of each cup to reduce a removal force required to extract the first cup 300a from within the second cup 300b. In the embodiment of FIG. 20, this offset is accomplished by the provision of an outwardly oriented projection 306. The offset or gap 320 is contemplated being a constant gap around a perimeter or circumference. In further embodiments, it is contemplated that this gap is a non-constant gap around a circumference of a cup. The gap between cups is contemplated as comprising various dimensions. In some embodiments, a gap is provided that is between approximately 0.0001 inches and 0.010 inches. In preferred embodiments, the gap comprises gap of between approximately 0.001 inches and 0.006 inches. In further preferred embodiments, a gap is provided that is between approximately 0.001 and 0.00525 inches and various based on a radial position.

The projection 306 of FIG. 20 comprises an annular or semi-annular projection or protrusion provided at an intersection of adjacent cup panels 316, 318. The projection 306a of the first cup 300a is sized and operable to contact an upper portion 302b of the second cup 300b in FIG. 20. As shown, the projection 306a creates a limit to the extent to which the first cup 300a is allowed to extend into or next into the second cup 300b. As shown in FIG. 20, the projection 306 prevents contact between certain portions of the cups. For example, in the embodiment of FIG. 20, contact between the domed portions 304a, 304b is prevented as is contact between various panels of each cup 300a, 300b. Gaps are provided at various locations along the height of the cup, thereby reducing friction between the cups and reducing the required pull-out or removal force. A gap 320 is shown between an upper portion of a first panel 308 of the second cup 300b and a lower portion of the first cup 300a. In certain embodiments, a second contact point is provided at this location (320 in FIG. 20). The contact may be achieved by, for example, extending the height of the first panel 308 and/or reducing a height of an uppermost panel 318. Thus, in certain embodiments, two contact points are provided between two adjacent cups and gaps are preferably maintained between panels of the cups.

FIG. 21 is a detailed cross-sectional elevation view of a portion of a cup 300 according to the embodiment of FIG. 20. As shown, an upper end of the cup comprises a curl 302a with an uppermost panel 318 extending therefrom. The uppermost panel 318 is depicted as a vertical panel in FIG. 21, although alternative wall angles are contemplated. For example, various containers and cups of the present disclosure are contemplated as comprising wall angles between approximately 3 and 20 degrees.

The uppermost panel 318 transitions into an outward projection 306a which is contemplated as comprising a semiannular projection. In preferred embodiments, the semiannular projection 306a extends 360 degrees around the cup. In alternative embodiments, the projection extends along one or more portions of a cup's circumference and is not a continuous feature or a single projection. Although various embodiments of the present disclosure contemplate a semiannular projection, alternatively shaped projections are contemplated. For example, projections with triangular cross-sections and various other shaped projections are contemplated that achieve the goals and objections of the present disclosure. The projection 306a transitions into an adjacent panel 316. Various additional panels are contemplated as being provided (see FIG. 20). It is contemplated that projections in various forms and shapes, including dimples and circular projections are provided and may be formed by an outward force or impact during manufacturing. In some embodiments, one or more vertically extending projections are provided on an interior or exterior of a cup to provide contact with an adjacent cup and achieve an offset. While various embodiments of the present disclosure contemplate forming a projection as part of the cup forming process, alternative embodiments contemplate adding a projection or similar feature as a separate process. For example, in some embodiments, a projection, bead, or spot-weld feature is provided on a cup after the cup is at least partially formed from a stock material.

Referring again to FIG. 21, the projection 306 provides a first outer diameter of the cup as defined by either a continuous projection or between two opposing projections. The uppermost panel 318 comprises an internal diameter D2 defining a panel or cup section of the largest internal diameter. In various embodiments, the internal diameter D2 comprises a diameter of between approximately 1.0 and approximately 5.0 inches. More preferably, D2 comprises a diameter of between 2.0 and 4.0 inches. In various embodiments, cups are provided with an internal diameter D2 that varies based on cup size. For example, an internal diameter D2 of between 3.610 and 3.625 inches is provided for 16, 20 and 24 ounce cups; an internal diameter D2 of between 2.850 and 2.865 inches is provided for 9 and 12 ounce cups. Such dimensions are provided to illustrate certain contemplated embodiments. Alternative embodiments and proportions are contemplated, and no limitation with respect to cup size and diameter is provided. In preferred embodiments, the first diameter D1 is greater than the second diameter and provides a contact point or resting surface for the cup. In some embodiments, the first diameter is between 1.001 times larger and 1.2 times larger than the second diameter. Accordingly, in various embodiments, an outer diameter D1 formed by the projection 306 is between approximately 3.628 inches and 4.35 inches (for 16, 20 and 24 ounce cups, for example) and between approximately 2.002 and 2.40 inches for smaller cup sizes. In some embodiment, 9 and 12 ounce cups are provided with outer diameters D1 of approximately 2.869 inches and 3.438 inches, respectively.

The projection comprises a radius R1 that is preferably between approximately 0.0050 inches and 3.0 inches. In preferred embodiments, the projection comprises a single, constant radius. In alternative embodiments, one or more projections are provided that comprise multiple radii of curvature and/or linear portions, such as protrusions of triangular cross-sections and various other shapes of projections.

FIG. 22 is a cross-sectional elevation view of cups 400a, 400b provided in a stacked or stacking arrangement. As shown, first and second cups 400a, 400b each comprise an upper portion with a peripheral curl 402a, 402b and lower portion having an upstanding dome portion 404a, 404b. A cup height extends between the upper portion and lower portion of each cup, and a plurality of cup sections or panels 408, 410, 412, 414, 416, 418 are provided along the height. The panels are shown and labeled with respect to the second cup 400b in the interest of clarity. It will be recognized, however, that the two cups of FIG. 22 comprise substantially the same layout and geometry. The cup shape including number of panels and size of panels may vary. In preferred embodiments, each cup comprises a plurality of panels wherein the panels sequentially decrease in diameter from top-to-bottom to form the tapered profile shown in FIG. 22, for example. As shown in FIG. 22, it is an object of the present disclosure to provide an offset and/or prevent contact between bottom portions of each cup to reduce a removal force required to extract the first cup 400a from within the second cup 400b. In the embodiment of FIG. 22, this offset is accomplished by the provision of inwardly oriented projection 406. The projection 406 of FIG. 22 comprises an annular or semi-annular projection or protrusion provided at an intersection or transition of the peripheral curl 402 and the uppermost panel 418. The projection 406a is sized and operable to contact an exterior of an adjacent cup. More specifically, and as shown in FIG. 22, the projection 406b of the second cup extends inwardly toward a centerline of the cup 413 and is operable to contact a lower portion of the uppermost panel 418 of the first cup. As shown, the projection 406 creates a limit to the extent to which the first cup 400a is allowed to extend into or nest into the second cup 400b. As shown in FIG. 22, the projection 406 prevents contact between the cups. For example, in the embodiment of FIG. 22, contact between the domed portions is prevented as is contact between the panels of each cup 400a, 400b. Gaps are provided at various locations along the height of the cup, thereby reducing friction between the cups and reducing the required pull-out or removal force. A gap 420 is shown between an upper portion of a first panel 408 of the second cup 400b and a lower portion of the first cup 400a.

In certain embodiments, a second contact point is provided at this location (420 in FIG. 22). The contact may be achieved by, for example, extending the height of the first panel 408 and/or reducing a height of various panels (e.g. panel 418 in FIG. 22). Thus, in certain embodiments, at least two contact points are provided between two adjacent cups and gaps are preferably maintained between panels of the cups. The gaps reduce a frictional force provided between the cups and, in some embodiments, reduce a vacuum or suction force between the cups and allow for easier separation and removal of cups from a stacked arrangement.

FIG. 23 is a detailed cross-sectional elevation view of a portion of a cup 400 according to the embodiment of FIG. 22. As shown, an upper end of the cup comprises a curl 402a with an uppermost panel 418 extending therefrom. The uppermost panel 418 is depicted as a vertical panel in FIG. 23, although alternative wall angles are contemplated. A projection 406a is provided at a transition between the curl 402a and the uppermost panel 418. The projection 406a comprises an inward projection which is contemplated as comprising a semiannular projection. In preferred embodiments, the projection 406a extends 360 degrees around the cup. In alternative embodiments, the projection extends along one or more portions of a cup's circumference and is not a continuous feature or a single projection. In addition, projections may comprise various cross-sectional shapes and exterior appearances. As used herein, the term "semi-annular" refers to the cross-sectional shape of the projection, which is a partial circle extruded around a point of rotation. The extrusion and projection may comprise a 360 degree projection, or some circumference less than 360 degrees. The projection 406a transitions into the uppermost panel 418. Various panels are contemplated as being provided (see FIG. 22). The cup comprises a first internal diameter D3 defined by the inner surface of the inward projection 402a. A second internal diameter D4 is provided which is larger than the first internal diameter D3 and wherein the second internal diameter D4 comprises an internal diameter of a cup section formed by the uppermost panel 418.

As discussed, the projection 406a can be continuous around the entire circumference of the cup or can be broken into any number of smaller discontinuous features around the circumference. For the purposes of FIG. 23, D3 is considered as a diameter between a continuous, 360 degree projection or as a distance between opposing projections positioned approximately 180 degrees apart. The first internal diameter D3 of FIG. 23 comprises a diameter that is at least partially defined by the projection 406a. The projection 406a comprises a radius of curvature R2. The radius of curvature is contemplated as comprising a radius of between approximately 0.005 inches and approximately 3.0 inches. The radius is preferably continuous, but projections having varying radii of curvature are also contemplated.

In various embodiments, the first internal diameter D3 comprises a constriction at or near the top of the cup 400 that is between approximately 0.8 times the second internal diameter D4 and approximately 0.999 times the second internal diameter D4. Accordingly, the first internal diameter D3 is contemplated as being a function of the second internal diameter D4. For certain cups (e.g. 16, 20 and 24 ounce volume cups), the second internal diameter D4 comprises a diameter of approximately 3.625 inches, and the first internal diameter D3 formed by the projection is between approximately 2.90 and 3.621 inches. For smaller cups comprising a second internal diameter D4 of 2.0 inches, the first internal diameter D3 formed by the projection is between approximately 1.6 and 1.999 inches. In various embodiments, it is contemplated that the first internal diameter D3 is between approximately 1.0 and 5.0 inches. However, as discussed herein, the first internal diameter D3 is preferably a function of related cup feature geometries. Various dimensions provided with respect to FIG. 23 and other Figures and embodiments are provided for illustrative purposes only. Various different dimensions and proportions are contemplated as being within the scope of various inventive features of the present disclosure. No limitation with respect to dimensions or proportions is provided.

While projections of the present disclosure have been illustrated as being provided in certain locations including, for example, a lower, outer region of an uppermost panel (306a in FIG. 20) and an inner region of a peripheral curl (406a in FIG. 22), it will be recognized that the present disclosure is not limited to cups having projections in these specific locations. As shown and described herein, cups without projections are contemplated. Additionally, projections provided at alternative locations are contemplated. For example, some embodiments of the present disclosure contemplate providing an outward projection a point along a height of an uppermost panel (e.g. anywhere along the height of panel 318 in FIG. 20) which is brought to rest on a curl of a cup in which the first cup is nested. In additional embodiments, an inward projection is contemplated as being provided on an upper panel and below the peripheral curl. No limitation with respect to the specific or relative positioning of projections is provided. Projections at different locations on one or more panels may be formed, for example, by fly spinning techniques and similar processes.

Projections as shown and described herein are also contemplated as being provided on various different panels. For example, a projection may be provided on an upper portion of panel 412 of FIG. 22 that creates the offset(s) and gap(s) as shown and described herein.

In various embodiments, methods of forming cups are provided. In some embodiments, at least one projection is formed in a cup to provide a contact or resting point and wherein the projection is formed during a first expansion operation of the cup. The projection is formed by pushing on a rib or transition between cup sections (e.g. the transition between the uppermost panel and an adjacent panel. In further embodiments, it is contemplated that projections of the present disclosure are formed with an independent press that pushes on a rib or transition while retaining the rest of the cup. It is further contemplated that a rotary action is provided to pushes rollers into the rib or transition in a manner similar to the action of a spinner or dome reformer tool. For example, circumferential grooves or features are contemplated as being created by spinning rollers around an outer diameter of a cup with force pushing inwardly to create a bump or feature. It is also contemplated a tool is inserted into a cup and material is spun outwardly to form features. It is further contemplated that a reverse taper operation is provided wherein the curl of a cup is held and a punch is used to push on the rib or transition on or proximal to which a projection is to be formed, and the rib is pushed against a die with springs thus forcing the rib outwards. Additionally, an expansion tool is contemplated as being provided that squeezes past the curl and expands an uppermost panel to form a projection. It is also contemplated that a cam activated tool is provided that pushes multiple discontinuous bumps into a rib.

Inwardly extension projections provided adjacent to curl, such as those shown in FIGS. 22-23, for example, are contemplated as being formed by one or more processes. For example, a tool is contemplated as being provided in the curling die that allows for a section of the curl to move or "bump" inwardly. Additionally, a cam activated tool is contemplated that flattens or "smashes" the curl. Further, it is contemplated that a set of tooling is provided that retains the curl and pulls on the base of a cup, thereby unravelling or partially unravelling the curl. Further, it is contemplated that a reverse taper operation is provided wherein the curl is allowed to move inwardly and the rib or transition between panel is retained in place.

Various features and embodiments of a metal cup have been provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A method of forming a thin-walled tapered metallic cup, the method comprising:
   providing a stock material;
   forming the cup from a blank of the stock material using a blank and draw operation;
   performing an ironing step on the cup;
   performing a redrawing operation on the cup to provide the cup with a predetermined height and a wall thickness;
   subsequent to the redrawing operation, trimming the cup;
   curling the top edge of the cup to form a lip;
   performing a plurality of further drawing steps to form a plurality of straight walled sections and wherein each of the straight walled sections comprise successively smaller diameters and are separated by at least one of a step and a rib provided as a transition point between adjacent straight walled sections and to add strength to the cup;
   subsequent to the plurality of drawing steps, expanding each of the straight walled sections to a larger diameter with a die comprising a tapered profile and wherein at least one straight walled section comprises a wall thickness of between approximately 0.0040 inches and 0.0090 inches;
   wherein an uppermost straight walled section comprises a vertical straight walled section having a first diameter;
   forming at least one outwardly oriented annular or semi-annular projection proximal to a bottom of the uppermost straight walled section to provide a contact point for adjacent cups, and wherein the at least one projection is formed by an operation wherein at least the top edge of the cup is held in place and the projection is forced outwardly into a die;

wherein the projection comprises a second diameter that is between 1.001 and 1.2 times larger than the first diameter and creates a limit to the extent to which the first cup can extend into an adjacent second cup of the same construction and such that a contact point is provided between the projection of a first cup and a curled top edge of the adjacent second cup, and an offset between bottom portions of the first cup and the adjacent second cup is provided by the contact of the projection of the first cup and the curled top edge of the second cup;

wherein a variable distance is provided between adjacent cups along a height of the cup below the contact point; and wherein a gap is provided between a lowermost portion of the first cup and an upper portion of a first panel of the second cup, said gap comprising a gap of between approximately 0.001 inches and 0.006 inches.

2. The method of claim 1, wherein the projection is provided at a transition between adjacent straight walled sections.

3. The method of claim 1, wherein the lip comprises a third diameter that is larger than the second diameter.

4. The method of claim 1, wherein the contact point extends around an entire circumference of the adjacent stacked cups.

5. A method of forming a metallic cup, the method comprising:

providing a stock metal material;

forming the cup from a blank of the stock metal material using a blank and draw operation;

performing an ironing step and a redrawing operation on the cup to provide the cup with a predetermined height and a wall thickness;

curling a top edge of the cup to form a lip;

performing a plurality of further drawing steps to form a plurality of straight walled sections and wherein each of the straight walled sections comprise successively smaller diameters and are separated by at least one of a step and a rib provided as a transition point between adjacent straight walled sections;

expanding each of the straight walled sections with a die comprising a tapered profile;

wherein an uppermost straight walled section comprises a vertical straight walled section having a first diameter and an adjacent section is provided at an angle relative to the vertical straight walled section;

forming at least one outwardly oriented projection proximal to a bottom of the uppermost straight walled section to provide a contact point for adjacent cups, wherein the at least one outwardly oriented projection is formed by holding at least the top edge of the cup in place and applying force to the cup to form a rib by outwardly moving metal into a die; and wherein the projection comprises a second diameter that is between 1.001 and 1.2 times larger than the first diameter such that a contact point is provided between the projection and a curled top edge of an adjacent cup and an offset between bottom portions of adjacent stacked cups is provided by the contact between the projection and the curled top edge of the adjacent cup;

wherein a variable distance is provided between adjacent cups along a height of the cup below the contact point; and wherein a gap is provided between a lowermost portion of the first cup and an upper portion of a first panel of the second cup, said gap comprising a gap of between approximately 0.001 inches and 0.006 inches.

6. The method of claim 5, wherein the projection is provided at a transition between adjacent sections.

7. The method of claim 5, wherein the lip comprises a third diameter that is larger than the second diameter.

8. The method of claim 5, wherein the contact point extends around an entire circumference of the adjacent stacked cups.

* * * * *